US006980735B2

(12) United States Patent
Horiguchi

(10) Patent No.: US 6,980,735 B2
(45) Date of Patent: *Dec. 27, 2005

(54) CAMERA, AN IMAGE INPUTTING APPARATUS, A PORTABLE TERMINAL DEVICE, AND A METHOD FOR TRANSFORMING THE CAMERA CONFIGURATION

(75) Inventor: Shigeru Horiguchi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/360,800

(22) Filed: Feb. 10, 2003

(65) Prior Publication Data

US 2003/0118340 A1    Jun. 26, 2003

Related U.S. Application Data

(63) Continuation of application No. 09/813,957, filed on Mar. 22, 2001, now Pat. No. 6,591,069.

(30) Foreign Application Priority Data

Mar. 22, 2000  (JP) ........................... P2000-081056

(51) Int. Cl.⁷ .................. G03B 17/48; G03B 19/00; G03B 29/00; H04M 1/00; H04N 11/00
(52) U.S. Cl. ................ 396/429; 348/333.02; 348/552; 455/556.1
(58) Field of Search ............................... 396/535, 539, 396/540, 57, 429; 348/333.06, 14.01, 552; 455/575.3, 556.1, 566, 74

(56) References Cited

U.S. PATENT DOCUMENTS

| | | | | |
|---|---|---|---|---|
| 4,839,802 A | * | 6/1989 | Wonak et al. | 710/14 |
| 5,210,789 A | * | 5/1993 | Jeffus et al. | 379/127.01 |
| 5,606,420 A | * | 2/1997 | Maeda et al. | 358/296 |
| 5,610,723 A | * | 3/1997 | Yamagishi | 386/75 |
| 5,739,859 A | | 4/1998 | Hattori et al. | 348/375 |
| 5,987,122 A | * | 11/1999 | Daffara et al. | 379/433.13 |
| 5,991,644 A | * | 11/1999 | Ogawa | 455/566 |
| 6,128,185 A | | 10/2000 | Fuhs et al. | 361/683 |
| 6,137,525 A | | 10/2000 | Lee et al. | 348/14.02 |
| 6,141,540 A | * | 10/2000 | Richards et al. | 455/575.3 |
| 6,295,088 B1 | | 9/2001 | Tsukahara et al. | 348/333.06 |
| 6,308,084 B1 | * | 10/2001 | Lonka | 455/556.1 |
| 6,323,902 B1 | * | 11/2001 | Ishikawa | 348/552 |
| 6,327,001 B1 | | 12/2001 | Yamagishi | 348/552 |
| 6,427,078 B1 | * | 7/2002 | Wilska et al. | 455/550.1 |
| 6,573,939 B1 | * | 6/2003 | Yokoyama | 348/375 |
| 6,591,069 B2 | * | 7/2003 | Horiguchi | 396/429 |
| 6,751,473 B1 | * | 6/2004 | Goyal et al. | 455/556.1 |

\* cited by examiner

*Primary Examiner*—Christopher Mahoney
(74) *Attorney, Agent, or Firm*—Oblon, Spivak, McClelland, Maier & Neustadt, P.C.

(57) ABSTRACT

A camera has a camera body formed in a longitudinal rectangular shape, and in the intermediate portion of the camera body, a flexion/transformation mechanism dividing the camera body into an image photographing section including a lens system for capturing an optical image of a subject and a gripping section for a photographer to grip the camera body at the time of photographing is provided. The flexion/transformation mechanism is configured so as to dispose the image photographing section and the gripping section on a same straight line such that the camera body is formed in the longitudinal rectangular shape in a first state, and to dispose the gripping section angled relative to said image photographing section in a second state.

99 Claims, 27 Drawing Sheets

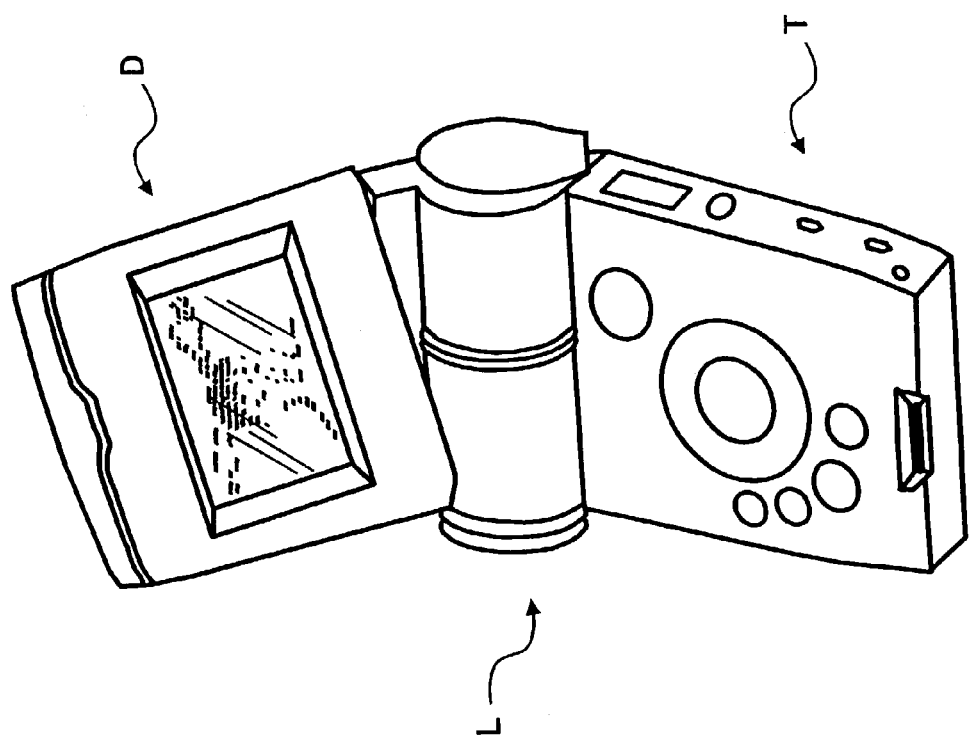

CAMERA, AN IMAGE INPUTTING APPARATUS, A PORTABLE TERMINAL DEVICE, AND A METHOD FOR TRANSFORMING THE CAMERA CONFIGURATION

CROSS REFERENCE

This application claims benefit of priority under 35 U.S.C. 120 to Japanese Patent Application No. 2000-081056 filed in the Japanese Patent Office on Mar. 22, 2000, the entire contents of which are incorporated by reference.

BACKGROUND OF THE INVENTION

1. Field of the Invention

The present invention relates to improvement in the configuration of cameras, image inputting apparatus, and portable terminal devices, and in particular relates to cameras, image inputting apparatus and portable terminal devices having view finder structures suitable for electronic cameras recording, in a recording medium, image information obtained by image photographing elements such as a solid-state image photographing element, etc., and methods of transforming the camera body configuration.

2. Discussion of the Background

In recent years, cameras called "digital cameras" have been rapidly popularized. Digital cameras photograph an image of a subject by use of a solid-state image photographing element such as, for instance, a CCD (Charge Coupled Device) image photographing element, etc. The cameras obtain image data of a static image (still image) or a moving image (movie image) of the subject, and digitally record the obtained data in an IC (Integrated Circuit) recording medium or a floppy disc, etc. Multi-media cards employing flash memory, SD cards, smart-media, and compact flash memory, etc., called "smart cards," are generally used as the IC recording medium. In addition to those card-state recording media called "smart cards," recording media also employing flash memory in a similar way but having other shapes than flat card-like shapes, for instance, a memory stick, etc. are also used.

In the digital camera field, electronic functional parts have been highly developed, compared with conventional silver salt cameras employing silver salt films, such that it is relatively easy to make digital cameras small. In addition, restrictions as to the structure and arrangement of parts have been reduced, and freedom in camera configuration has been increased. For this reason, there have appeared digital cameras having new configurations different from that of conventional cameras.

In reducing the size of a camera so that the portability thereof is enhanced, it is conceivable to form the camera in a small block, an elongated stick, or a flat shape. In reducing the size of a camera, if the requirement is only that the camera is suitable for being carried by hand or being hung around the neck as an accessory, the camera can be made small in any shape so long as it is small enough to be easily carried and the shape is suitable for use as an accessory. However, when the photographing operation is taken into consideration, if the camera is excessively small, the photographing operation tends to become complicated or difficult. In addition, it may become difficult to hold the camera at the time of photographing. Furthermore, when ease in putting the camera into a bag, etc. and convenience in placing the camera in the bag are taken into consideration, an elongated-stick shape or a flat shape is more preferable than a block shape.

A known digital camera, for example, Digital Camera SDC-007 of Samsung Electronics Corporation, has two folding configurations, as illustrated in FIG. 27. As illustrated FIG. 26, the camera is divided into three sections, an LCD (Liquid Crystal Display) displaying section D, an operation board section T, and a lens system section L for image photographing operation. The LCD displaying section D and the operation board section T are formed in a flat-box shape, and the camera can be folded with the axis of the lens system section L as the fulcrum. When the camera is carried, it is folded in two such that the LCD displaying section D is superposed on the operation board section T, so as to be compact.

However, when the above-described camera is folded in two, the thickness thereof increases, causing inconvenience in being accommodated in a bag etc. Therefore, the portability of the camera is not necessarily good.

Further, when photographing with the above-described camera, the LCD displaying section D is opened with the lens system portion L as the fulcrum, and while holding the operation board section T horizontally, a desired subject is photographed by observing an image displayed on the LCD displaying section D. The above-described camera is therefore difficult to hold, and is relatively poor in the operability. Further, hand shaking is easy to occur.

Furthermore, because of the large number of operational members such as the power source switch, the function selecting button, etc. that are arranged on the operation board section T, the operational members tend to be erroneously operated when holding or gripping the operation board section T.

Moreover, because the operation board section T of the above-described camera is formed elongated in the back-and-forth direction, that is, in the optical-axis direction of the lens system section L, it is difficult to hold the camera with one hand.

As described heretofore, digital cameras are desired to be compact, superior in portability, and shaped in appearance suitable for use as an accessory when carried by the user. Furthermore, cameras are desired to be easy to hold and operate when photographing. Other apparatuses each having an image photographing function, such as the silver salt camera, the portable image inputting apparatus that can be used instead of an image scanner or a video camera, a portable telephone set, and a portable information terminal or a PDA (personal digital ass instant), etc., are likewise desired to be compact, superior in the portability, and shaped in an appearance suitable for use as an accessory when carried by the user, and easy to hold and operate when photographing.

SUMMARY OF THE INVENTION

The present invention has been made in view of the above-discussed and other problems and addresses and solves the above-discussed and other problems.

Accordingly, preferred embodiments of the present invention provide a camera, an image inputting apparatus, and a portable terminal device, that are superior in portability, easy to be formed in a good outer appearance, superior in operability including holding ease in photographing and suitableness for one-hand operation, and hard to be shaken when photographing.

Preferred embodiment of the present invention further provide a method of changing camera configurations.

In particular, preferred embodiments of the present invention provides a camera, an image inputting apparatus, and a portable terminal device, that have a good portability and appearance suitable for use as an accessory and at the same time has superior holding ease and operability in photographing.

Further, preferred embodiments of the present invention provide a method of transforming the body of the camera, in which change can be easily made between a first state in which superior carrying portability and appearance are obtained and a second state in which holding ease and operability preferable in photographing are obtained.

According to a preferred embodiment of the present invention, the camera has the camera body formed in a longitudinal rectangular shape, and in the intermediate portion of the camera body, a flexion/transformation mechanism dividing the camera body into an image photographing section including a lens system for capturing the optical image of a subject and a gripping section for the photographer to grip the camera body at the time of photographing is provided. The flexion/transformation mechanism is configured so as to dispose the image photographing section and the gripping section on the same straight line such that the camera body is formed in the longitudinal rectangular shape in the first state, and to dispose the gripping section angled relative to said image photographing section in the second state.

According to another preferred embodiment of the present invention, the camera has the camera body comprising an image photographing section including a lens system for capturing an optical image of the subject; a gripping section for the photographer to grip at the time of performing the image photographing operation; and a flexion/transformation mechanism that is configured to connect the end of the image photographing section with the end of the gripping section so as to dispose the image photographing section and the gripping section on the same straight line such that the camera body is formed in the longitudinal rectangular shape in the first state, and to dispose the gripping section angled relative to the image photographing section in the second state.

In each of the above cameras, the flexion/transformation mechanism may include a flexional mechanism capable of angling the gripping section by almost 90 degrees relative to the image photographing section.

Further, the flexion/transformation mechanism may include a mechanism configured to connect the image photographing section and the gripping section with each other on an inclined surface obliquely intersecting with a straight line in the first state of disposing the image photographing section and the gripping section on the same straight line and to relatively rotate the both sections around the axis line substantially perpendicular to the inclined surface.

Furthermore, the flexion/transformation mechanism may include a mechanism configured to connect the image photographing section and the gripping section with each other so as to be relatively rotatable on the axis line substantially in parallel with the optical axis of the lens system in the state of disposing the image photographing section and the gripping section on the same straight line.

Still furthermore, the flexion/transformation mechanism may include a flexible connection member that cannot be easily bent, for connecting the image photographing section and the gripping section with each other.

Further, each of the above cameras may include a cover member that is configured to cover at least a part of the image photographing section and the flexion/transformation mechanism in the first state of disposing the image photographing section and the gripping section on the same straight line, so as to keep the state of disposing both sections on the same straight line, and to slidably move the both sections in a direction along the straight line so as to expose the flexing portion of the flexion/transformation mechanism and the object surface of the lens system of the image photographing section.

Furthermore, in each of the above cameras, the image photographing section may include at least one of a release button for performing a release operation, a strobe light emitting section for irradiating an illumination light onto the subject, a display section for indicating the operation state of the camera, and an optical finder for confirming the photographing visual field.

Furthermore, the gripping section may accommodate at least one of a battery as a power source and an image recording medium for recording the image of the subject. Further, in the above cameras, two or more of the flexion/transformation mechanisms may be provided in the intermediate portion of the camera body formed in a longitudinal rectangular shape, and the portion of the camera body between an end portion of the camera body and one of the flexion/transformation mechanisms and the portion nipped by the flexion/transformation mechanisms may be constructed as the gripping section.

Furthermore, the cameras may include a communication device for transmitting photographing information by wireless transmission.

Further, the cameras may include a power on/off device causing the power source to co-operate with the flexion/transformation mechanism to turn on the power source when the gripping section is angled relative to the photographing section.

According to another preferred embodiment of the present invention, an image inputting apparatus includes a body formed in a longitudinal rectangular shape, and in the intermediate portion of the body, a flexion/transformation mechanism dividing the body into an image photographing section including a lens system for capturing the optical image of a subject and a gripping section for a photographer to grip the body at the time of photographing is provided. The flexion/transformation mechanism is configured so as to dispose the image photographing section and the gripping section on a same straight line such that the body is formed in the longitudinal rectangular shape in the first state, and to dispose the gripping section angled relative to the image photographing section in the second state.

According to still another preferred embodiment of the present invention, an image inputting apparatus has a body including an image photographing section having a lens system for capturing the optical image of a subject; a gripping section for the photographer to grip at the time of performing the image photographing operation; and a flexion/transformation mechanism that is configured to connect the end of the image photographing section and the end the gripping section so as to dispose the image photographing section and the gripping section on the same straight line such that the body is formed in the longitudinal rectangular shape in the first state, and to dispose the gripping section angled relative to the image photographing section in the second state.

In each of the above image inputting apparatuses, the flexion/transformation mechanism may include a flexional mechanism capable of angling the gripping section by almost 90 degrees relative to the image photographing section.

Further, the flexion/transformation mechanism may include a mechanism configured to connect the image photographing section and the gripping section with each other on an inclined surface obliquely intersecting with a straight line in the first state of disposing the image photographing section and the gripping section on the same straight line and to relatively rotate the both sections around the axis line substantially perpendicular to the inclined surface.

Furthermore, the flexion/transformation mechanism may also include a mechanism configured to connect the image photographing section and the gripping section with each other so as to be relatively rotatable on the axis line substantially in parallel with the optical axis of the lens system in the first state of disposing the image photographing section and the gripping section on the same straight line.

Still furthermore, the flexion/transformation mechanism may include a flexible connection member that cannot be easily bent, for connecting the image photographing section and the gripping section with each other.

Further, each of the above image inputting apparatuses may include a cover member to cover at least a part of the image photographing section and the flexion/transformation mechanism in the first state of disposing the image photographing section and the gripping section on the same straight line, so as to keep the state of disposing both sections on the same straight line. The cover member slidably moves in a direction along the straight line so as to expose the flexing portion of the flexion/transformation mechanism and the object surface of the lens system of the image photographing section.

Further, the image photographing section may include at least one of a photographing operation section for performing a photographing operation, a strobe light emitting section, a display section for indicating an operation state of the apparatus, and an optical finder for confirming a photographing visual field.

Furthermore, the gripping section may accommodate a battery as a power source. Further, in each of the image inputting apparatuses, two or more of the flexion/transformation mechanisms may be provided in the intermediate portion of the body formed in a longitudinal rectangular shape, and the portion of the body between an end portion of the body and one of the two or more of the flexion/transformation mechanisms and the portion nipped by the flexion/transformation mechanisms may be constructed so as to be the gripping section.

Furthermore, each of the image inputting apparatuses may include a communication device for transmitting photographing information by wireless transmission.

Further, each of the image inputting apparatuses may include a power on/off device causing a power source to co-operate with the flexion/transformation mechanism to turn on the power source when the gripping section is angled relative to the photographing section. According to another preferred embodiment of the present invention, a portable terminal device has a body formed in a longitudinal rectangular shape, and in the intermediate portion of the body, a flexion/transformation mechanism dividing the body into an image photographing section including a lens system for capturing the optical image of a subject and a gripping section for the photographer to grip the body at the time of photographing is provided. The flexion/transformation mechanism is configured so as to dispose the image photographing section and the gripping section on the same straight line such that the body is formed in the longitudinal rectangular shape in a first state, and to dispose the gripping section angled relative to the image photographing section in a second state. According to still another preferred embodiment of the present invention, a portable terminal device has a body including an image photographing section including a lens system for capturing the optical image of a subject; a gripping section for the photographer to grip at the time of performing the image photographing operation; and a flexion/transformation mechanism configured to connect the end of the image photographing section with the end of the gripping section so as to dispose the image photographing section and the gripping section on a same straight line such that the body is formed in the longitudinal rectangular shape in a first state, and to dispose the gripping section angled relative to the image photographing section in a second state.

In each of the above portable terminal devices, the flexion/transformation mechanism may include a flexional mechanism capable of angling the gripping section by almost 90 degrees relative to the image photographing section.

Further, the flexion/transformation mechanism may include a mechanism configured to connect the image photographing section and the gripping section with each other on the inclined surface obliquely intersecting with the straight line in the first state of disposing the image photographing section and the gripping section on the same straight line and to relatively rotate the both sections around the axis line substantially perpendicular to the inclined surface.

Furthermore, the flexion/transformation mechanism may include a mechanism configured to connect the image photographing section and the gripping section with each other so as to be relatively rotatable on the axis line substantially in parallel with the optical axis of the lens system in the first state of disposing the image photographing section and the gripping section on the same straight line.

Further, the flexion/transformation mechanism may include a flexible connection member that cannot be easily bent, for connecting the image photographing section and the gripping section with each other.

Furthermore, in each of the above portable terminal devices, the image photographing section may further include at least one of a photographing operation section for performing a photographing operation, a strobe light emitting section, a display section for indicating an operation state of the device, and an optical finder for confirming the photographing visual field.

Further, the gripping section may accommodate a battery as a power source. Furthermore, each of the above portable terminal devices may include a communication device for transmitting photographing information by wireless transmission.

Further, the portable terminal devices may be a portable telephone terminal having the function of a portable telephone, or a portable information terminal having the function of processing information.

According to another preferred embodiment of the present invention, a method of transforming the body of a camera includes the step of flexing and transforming the camera body formed in a longitudinal rectangular shape, with a flexion/transformation mechanism provided in the intermediate part of the camera body, such that the image photographing section of the camera body including the lens system is substantially perpendicular to the remaining section of the camera body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 27 is a perspective view illustrating an outer appearance configuration of a background electronic camera.

DETAILED DESCRIPTION OF THE PREFERRED EMBODIMENTS

Figure 1:
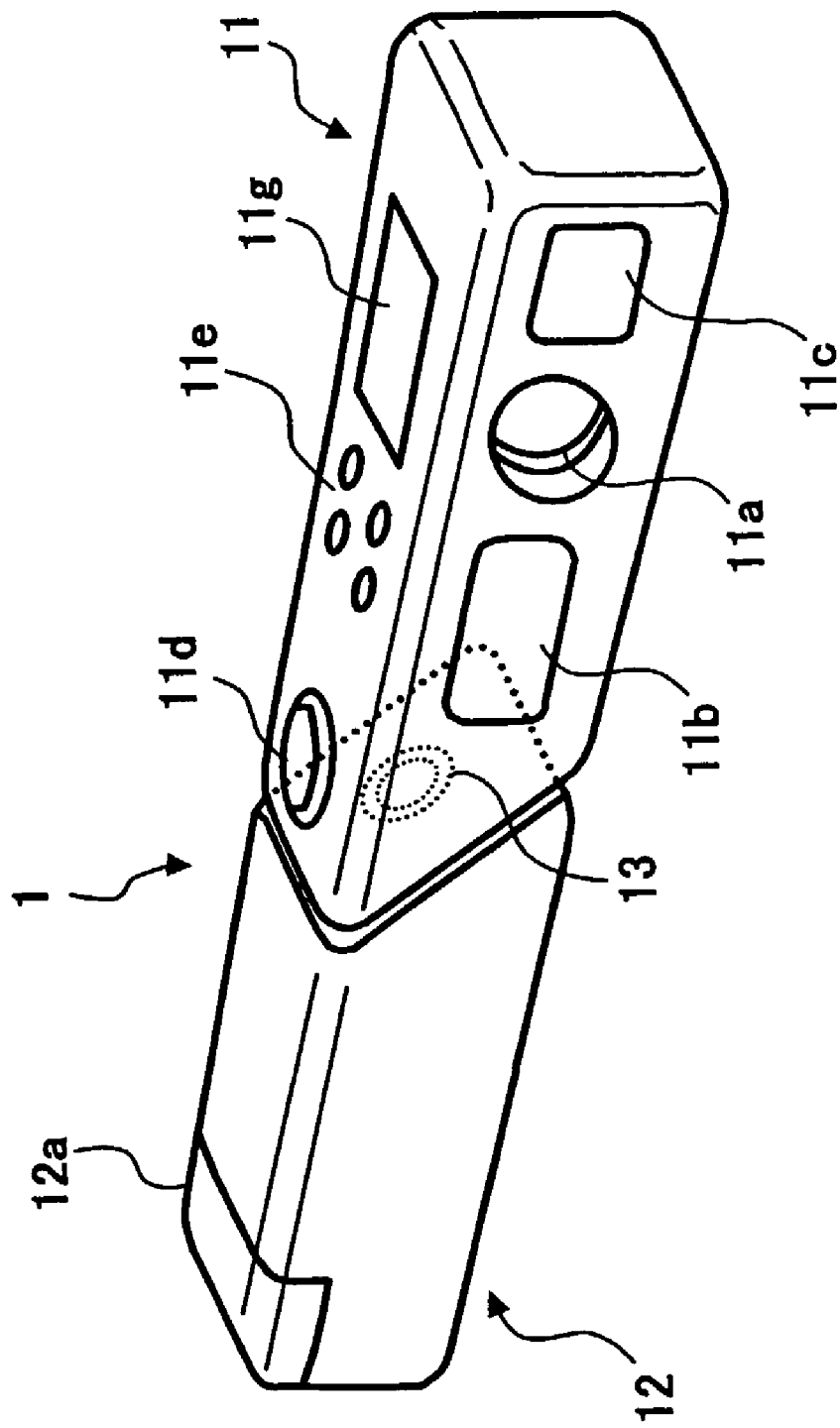
FIG. 1 is a perspective view of a camera as viewed at the front-surface side (subject side) of the camera, illustrating the structure of the camera in a state of being carried, according to a preferred embodiment of the present invention.

In describing the preferred embodiment of the present invention illustrated in the accompanying drawings, specific terminology is employed for the sake of clarity. However, the present invention is not intended to be limited to the specific terminology so selected and it is to be understood that each specific element includes all technical equivalents which operate in a similar manner.

Referring now to the accompanying drawings, wherein like reference numerals designate identical or corresponding parts throughout the several views or diagrams, and more particularly to FIGS. 1 through 26, there are illustrated a camera, an image inputting apparatus, a portable terminal device, and a method of changing camera configuration, according to preferred embodiments of the present invention.

Figure 2:
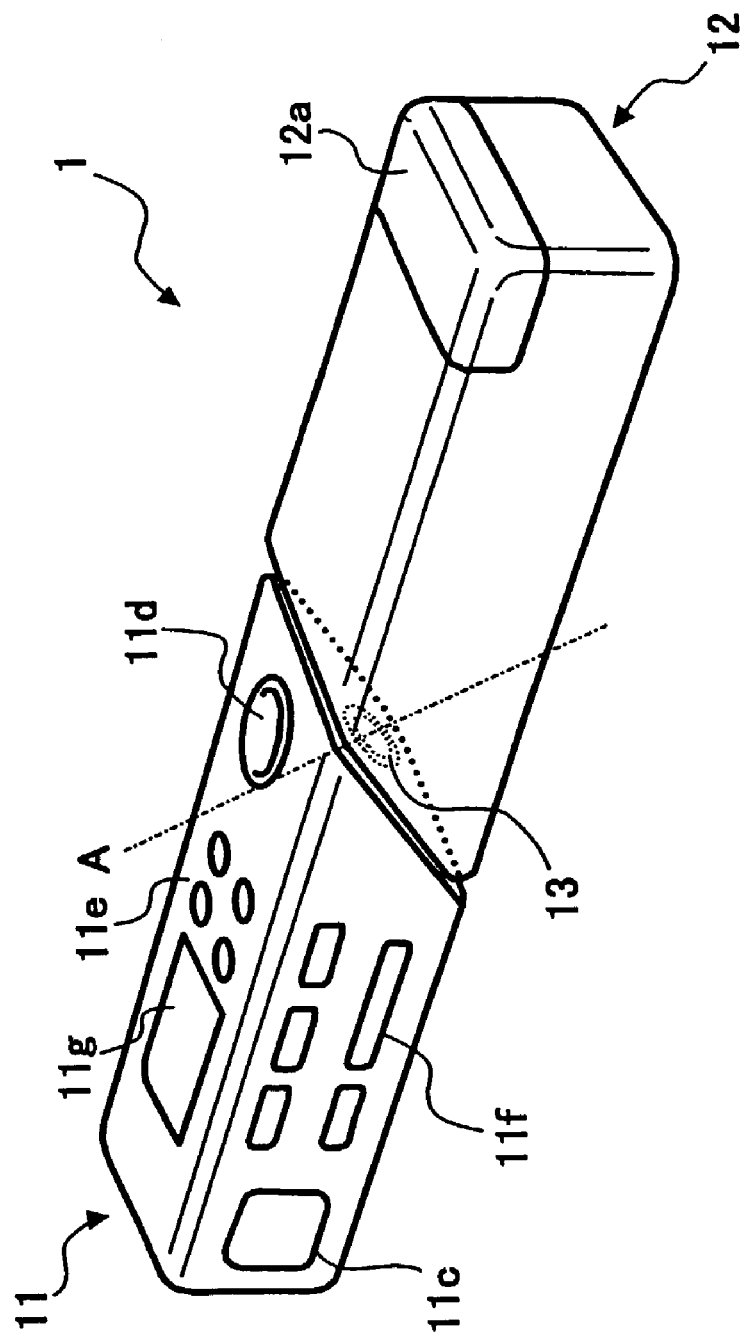
FIG. 2 is a perspective view of the camera of FIG. 1 as viewed at the back-surface side (photographer side) of the camera.
Figure 3:
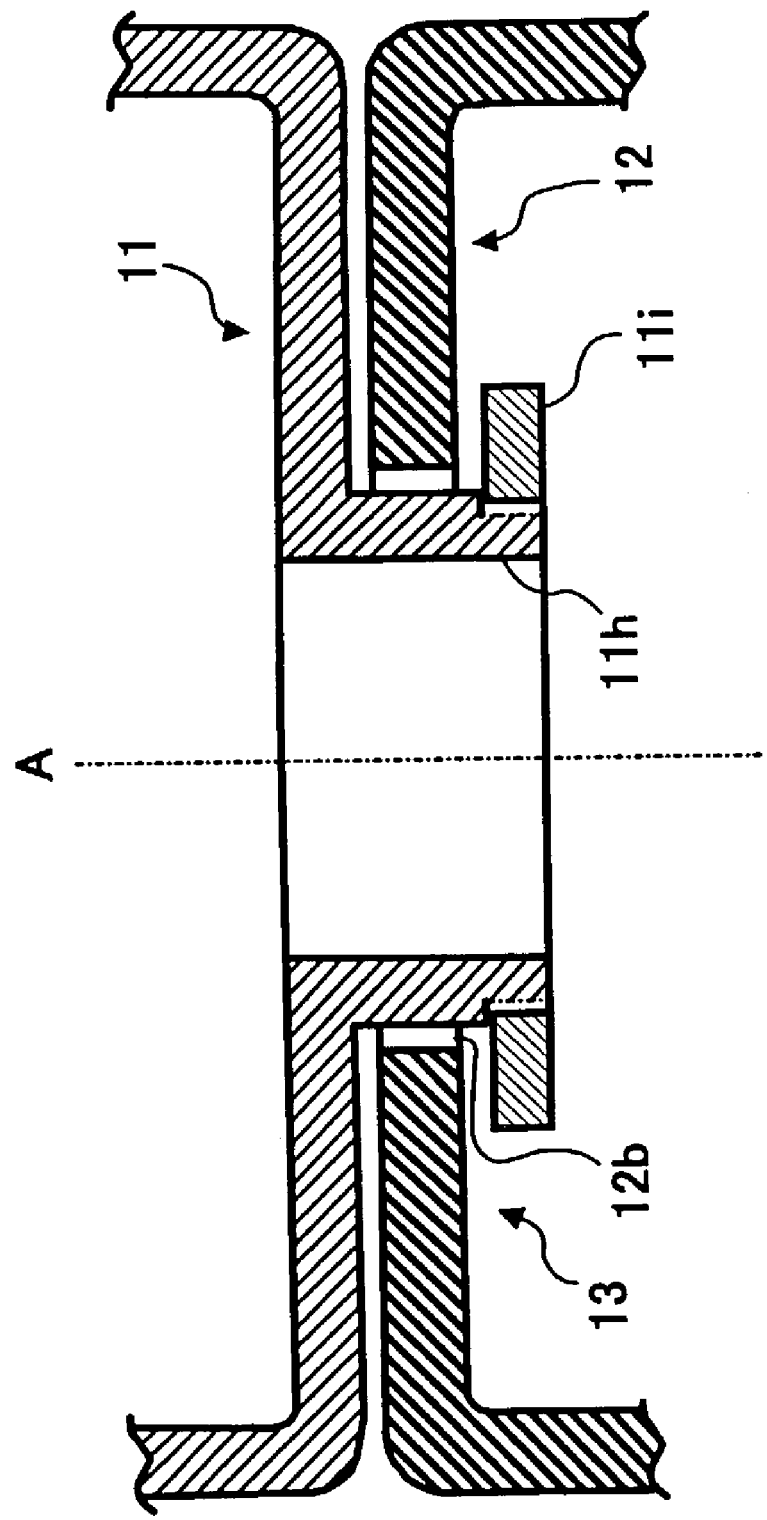
FIG. 3 is a cross-sectional view schematically illustrating the structure of the flexion/transformation mechanism of the camera.
Figure 4:
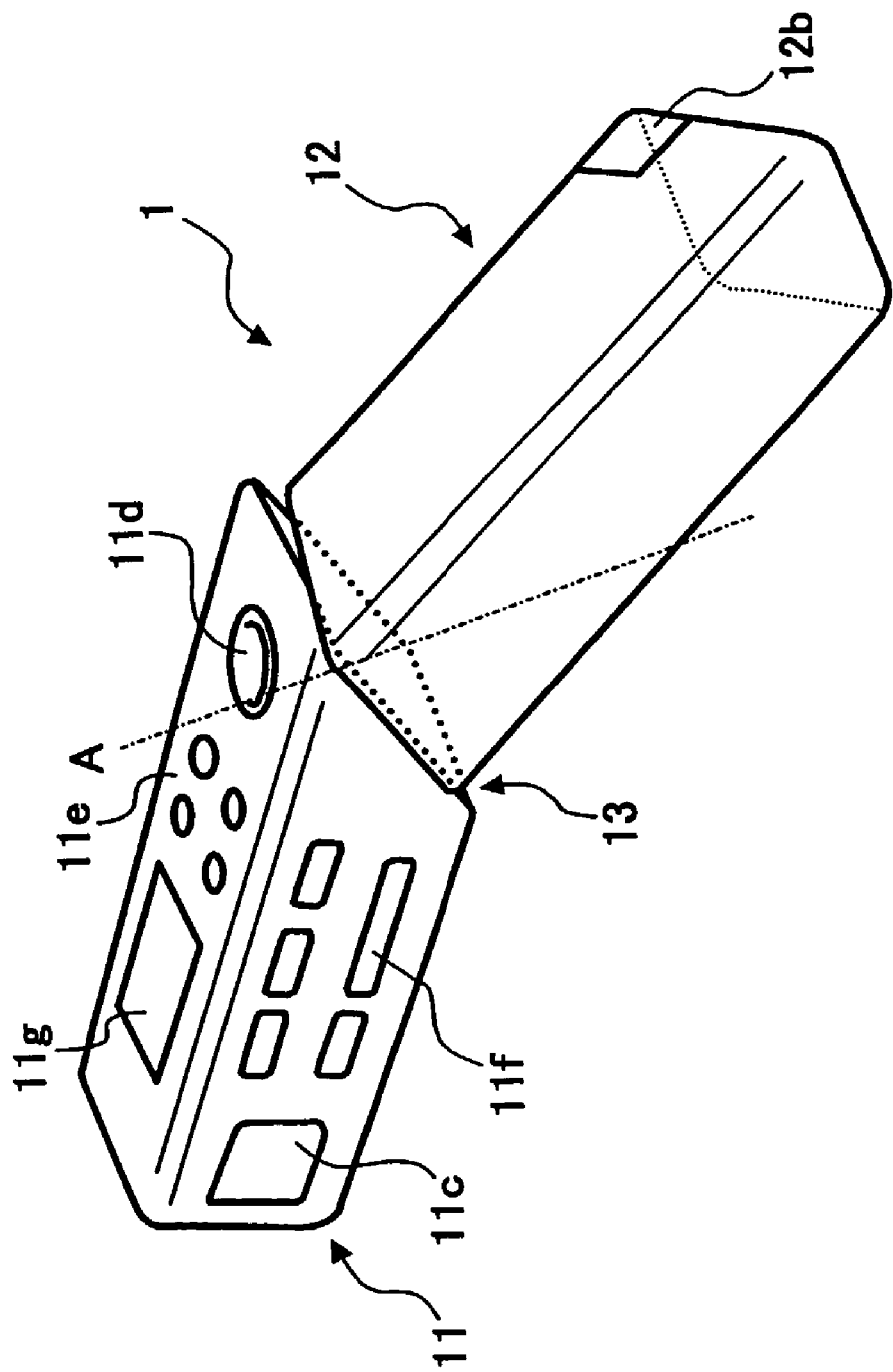
FIG. 4 is a perspective view of the camera as viewed at the back-surface side (photographer side) of the camera, illustrating the state of the camera on the halfway of being flexed.
Figure 5:
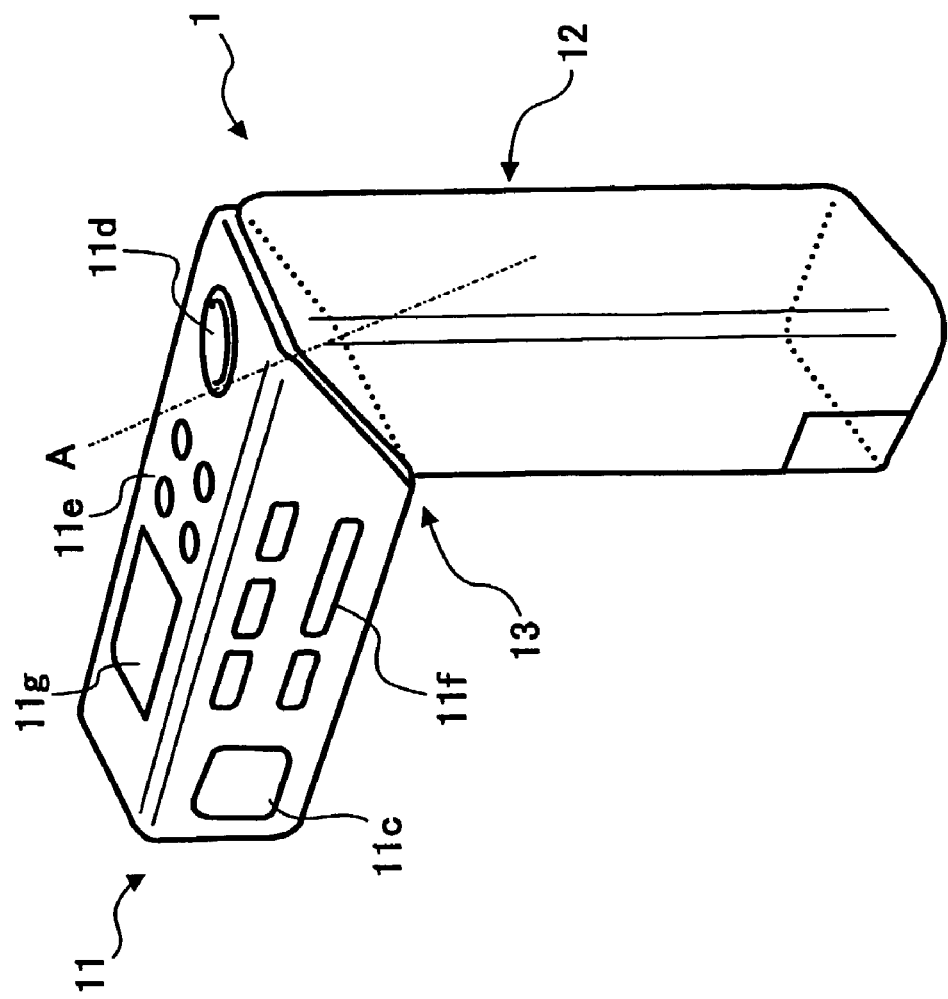
FIG. 5 is a perspective view of the camera as viewed at the back-surface side (photographer side) of the camera, illustrating a photographing state of the camera after having been flexed.
Figure 6:
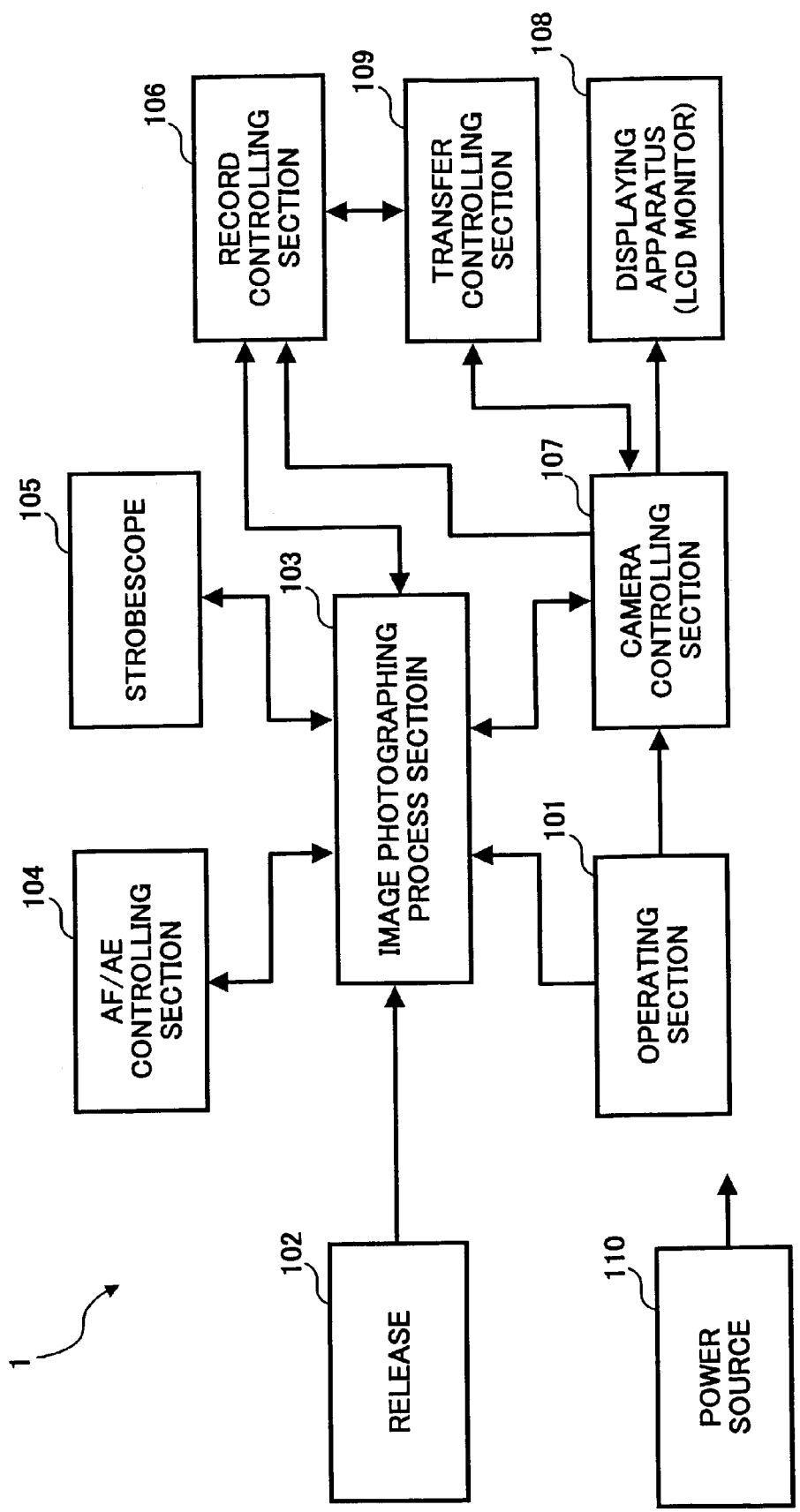
FIG. 6 is a block diagram illustrating the electronic structure of the camera.

FIGS. 1 through 6 illustrate the structure of a camera according to a preferred embodiment of the present invention. FIG. 1 is a perspective view as viewed at the front-surface side of the camera, that is, the subject side of the camera, schematically illustrating the structure of the camera in a state of being carried, and FIG. 2 is a perspective view as viewed at the back-surface side of the camera, that is, the photographer side of the camera of FIG. 1. FIG. 3 is a schematic cross-sectional view for explaining the structure of the flexion-deformation mechanism section of the camera. FIG. 4 is a perspective view of the camera as viewed at the back-surface side, illustrating the state of the camera on the halfway of being flexed. FIG. 5 is a perspective view of the camera as viewed at the back-surface side of the camera, illustrating the photographing state of the camera after having been flexed. FIG. 6 is a block diagram illustrating the electronic structure of the camera. The camera 1 as illustrated in FIG. 1 and FIG. 2 is, for instance, an electronic camera, which is provided with an image photographing section 11, a gripping section 12 and a flexion/transformation mechanism 13.

The image photographing section 11 is mainly a part directly relating to photographing of a subject image. The photographing section 11 includes a lens system 11a, a strobe light emitting section 11b, an optical finder 11c, a release button 11d, a mode button section 11e, an operation button 11f, and a display section 11g. Furthermore, the main part of an electronic circuit realizing the image photographing function of the camera 1 is accommodated in the image photographing section 11. The lens system 11a captures an optical image of a subject. The strobe light emitting section 11b radiates an illumination light onto a subject. The optical finder 11c is used for confirming a visual field of an image to be photographed by the lens system 11a with an optical image. Herein, although the finder should be referred to as a "view finder" to be exact, because the finder is generally and widely called a "finder", hereinafter, is simply called so. The release button 11d causes a timing of image photographing by being operated, and release operation is performed when it is operated. The mode button 11e includes one or more push switch buttons. Those buttons are used for performing the selection and setting of photographing modes and various sorts of operation modes, etc.

The operation button section 11f includes various sorts of operation buttons besides the mode button 11e, and the operation button section 11f is used for various sorts of operations besides the mode selection and setting. The display section 11g includes an LCD (Liquid Crystal Display), etc., and the display section 11g displays operation states resulting from the operation of the mode buttons 11e or the operation button section 11f, the number of photographed subjects, residual quantity of electricity in the battery, and other states of the camera 1.

The gripping section 12 is used as a grip for holding the camera at the time of photographing. The gripping section 12 accommodates, for instance, a battery as the power source and a recording medium for recording the image of the subject. Typically, the recording medium, as described above, uses a flash memory, such as a multi-media card, a SD card, a smart media, a compact flash memory, or a memory stick. For this reason, the gripping section 12 is provided with a memory cover 12a that opens and closes when setting and removing the recording medium.

As illustrated in FIG. 1 and FIG. 2, the image photographing section 11 and the gripping section 12 are linearly connected and arranged to form a quadrangular cylindrical body at the time of being carried. As illustrated in FIG. 1 and FIG. 2, the image photographing section 11 and the gripping section 12 are closely connected with each other on an inclined surface intersecting with an axis line of the quadrangular cylindrical body, for instance, a plane inclined by almost 45E relative to upper and lower surfaces of the camera 1. A flexion/transformation mechanism 13 is provided at a junction where the image photographing section 11 and the gripping section 12 are connected with each other. As illustrated in FIG. 3, the flexion/transformation mechanism 13 is constructed with a hollow cylindrical combining shaft section 11h protruding from the image photographing section 11, a flange stop-engaging section 11i expanding to the outer circumference at the end of the protruding combining shaft section 11h, and a passing through hole 12b formed at the gripping section 12. The combining shaft section 11h is inserted into the passing-through hole 12b and rotatably fitted thereto. A female screw of the flange stop-engaging section 11i engages with a male screw formed on the outer circumference of the combining shaft section 11h so as to prevent the combining shaft section 11h from slipping out therefrom. The combining section is constructed so as to have a suitable resistance to rotative movement utilizing frictional or viscous damping, etc., although not illustrated in FIG. 3, and is further constructed so as to stop at a predetermined rotational position as described later by use of a click stop mechanism, etc.

By use of the flexion/transformation mechanism 13 as described above, the image photographing section 11 and the gripping section 12 are connected with each other so as to be rotated around the combining shaft section 11h. Thereby, the camera 1 can be flexed and transformed in changing between a carrying state as illustrated in FIG. 1 and FIG. 2 in which the photographing section 11 and the gripping section 12 are arranged on a same straight line such that the camera 1 is formed in a shape of a quadrangular cylinder stick and a photographing state as illustrated in FIG. 5 in which the image photographing section 11 and the gripping section 12 are almost perpendicular to each other forming a shape of a reversed "L".

Namely, in the carrying state of the camera 1 illustrated in FIG. 1 and FIG. 2, the camera 1 is formed in a stick-like shape, such that the camera 1 is suitable for being carried in a bag, etc. or for being hung around the neck or the wrist by attaching a strap to the camera 1. Because it is difficult to photograph with the camera 1 in such a state, the image photographing section 11 and the gripping section 12 are rotated relatively by use of the flexion/transformation mechanism 13 illustrated in FIG. 3. The rotation shaft of the combining shaft section 11h of the flexion/transformation mechanism 13 is the axis line A illustrated in FIG. 2. When the gripping section 12 is rotated in the clockwise direction as illustrated in FIG. 2 from the combining surface with the image photographing section 11, the gripping section 12 is gradually angled relative to the image photographing section 11 as illustrated in FIG. 4. Finally, at the time of rotating by almost 180 degrees, the gripping section 12 becomes perpendicular to the image photographing section 11 as illustrated in FIG. 5, which is a photographing state.

Figure 7:
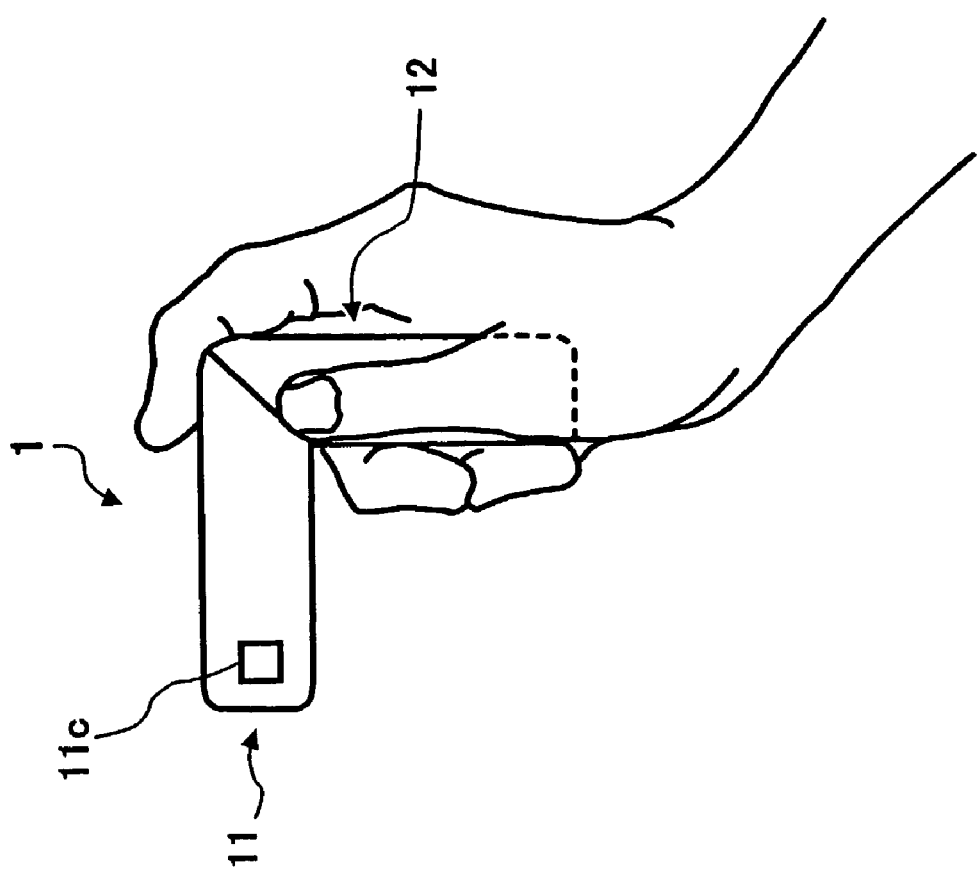
FIG. 7 is a diagram illustrating the state of gripping the camera at the time of photographing.

In such a state, as illustrated in FIG. 7, for instance, by gripping the gripping section 12 with the right hand, the photographer can easily operate the release button 11d with the index finger of the gripping right hand while viewing at the window of the optical finder 11C. For properly maintaining the above-described configurations of the carrying state and the photographing state even when an external force is applied to the camera 1, it is preferable to provide a stopping mechanism such as a click stop mechanism, etc. to the flexion/transformation mechanism 13, at the position corresponding to the carrying state illustrated in FIGS. 1 and 2 and at the position corresponding to the photographing state illustrated in FIGS. 5 and 7.

FIG. 6 is a block diagram illustrating a structure of an electronic circuit system for operating the camera 1 as illustrated in FIGS. 1 through 5. The electronic circuit system of the camera 1 illustrated in FIG. 6 includes an operating section 101, a release 102, an image photographing process section 103, an AF (Automatic Focusing)/AE (Automatic Exposure) control section 104, a strobe 105, a recording controlling section 106, a camera controlling section 107, a displaying apparatus 108, a transfer controlling section 109, and a power source 110.

The operating section 101 supplies operation information, by operating the mode button section 11e and the operation button section 11f, etc. in FIGS. 1, 2, 4, and 5, to the image photographing process section 103 and the camera controlling section 107.

The release 102 supplies the release information, by operating the release button 11d, to the image photographing process section 103, and causes the image photographing section 103 to perform taking-in of image data, that is, image photographing. The image photographing process section 103 operates the AF/AE control section 104, the strobe 105, the record controlling section 106, and the camera controlling section 107, etc. on the basis of a photographing mode set at that time point in response to release information, by operating the release button 11d, given from the release 102. The image photographing process section 103 causes each unit to selectively perform an AF and AE control, a light emission control of the strobe 105, a control of recording into a recording medium, and other controls of the camera operation as occasion demands, such that the image photographing operation is performed.

The AF/AE control section 104 co-operates with the image photographing process section 103, for instance, so as to perform an AF control on the basis of distance measuring information obtained by transmission/receipt of a distance measuring beam using an active method through an AF window (not illustrated). Furthermore, the AF/AE control section 104 obtains information of the light amount of a subject from the lens system 11a and the optical finder 11c, etc., a specially provided light-receiving element, or an image photographing element in the image photographing process section 103, so as to properly perform the exposure control.

The strobe 105 is controlled by the image photographing process section 103 and operates to activate the strobe light emitting section 11b when required in the AE control with the AF/AE control section 104 or when so instructed by a manual operation on the operating section 101. The record controlling section 106 writes image data obtained by the image photographing section 103 in a recording medium.

The camera controlling section 107 controls the image photographing process section 103 in accordance with the operation of the operating section 101 and causes the operation section 103 to perform the photographing operation. The display apparatus 108 is controlled by the camera control section 107, and has the function of displaying the state of the photographing mode, an operation mode of the strobe 105, and information of the voltage state of the power source 110 on a state displaying image surface of the display apparatus 108 on the basis of the operating state of the image photographing process section 103 and the camera controlling section 107.

The transfer controlling section 109 takes image data stored in a recording medium through the record controlling section 106 on the basis of the control of the camera controlling section 107 in accordance with the operation of the operating section 101, and transfers selectively or collectively the taken-out image data by use of a wire or wireless system to an outside PC (Personal Computer) or a portable information terminal (PDA), etc. In the transfer controlling section 109, for wireless communication with the PC or the portable information terminal, etc. at the time of transferring the image data, for instance, an interface based on the Bluetooth standard can be used. A battery is used for the power source 110 to supply the operational electric power to the above-described respective parts. The above-described gripping section 12 accommodates the battery as the power source 110 and a recording medium installing section, etc. In such a structure, it is necessary to supply electricity to the image photographing section 11 from the gripping section 12 and also to transmit and receive electric signals between the gripping section 12 and the image photographing section 11. Electricity supplying and signal lines can be inserted through the hollow portion of the flexion/transformation mechanism 13. A well-known slip ring and a movable conductive mechanism such as a brush, etc. can be also used in the flexion/transformation mechanism 13.

Moreover, the display apparatus 108 may be configured to include a display section 11g capable of displaying an image, and the camera controlling section 107 can cause the display section 11g of the display apparatus 108 to display subject images before being photographed or being photographed, or photographed subject images stored in a recording medium. On this occasion, the display apparatus 108 is controlled by the camera controlling section 107, so as to display subject images before being photographed or being photographed with the image photographing element of the image photographing process section 103 on a screen of the display section 11g such that the display apparatus 108 is used as the electronic finder, or to reproduce and display subject images stored in the recording medium, etc. with the record controlling section 106.

By thus structuring the camera 1 as described above, when the camera 1 is carried, the camera 1 can be put in a stick-like shape having a preferable outer appearance, so as to be superior in the portability and to be capable of being used as an accessory. Further, when photographing with the camera 1, the camera 1 can be flexed and transformed by the flexion/transformation mechanism 13, such that the image photographing section 11 is almost horizontal while the gripping section 12 is almost vertical, i.e., formed in a reversed L-shape. Thereby, the camera 1 can be held surely, and there is almost no danger of instability caused by a shaky hand because of the adoption of a reversed L-shape.

Figure 8:
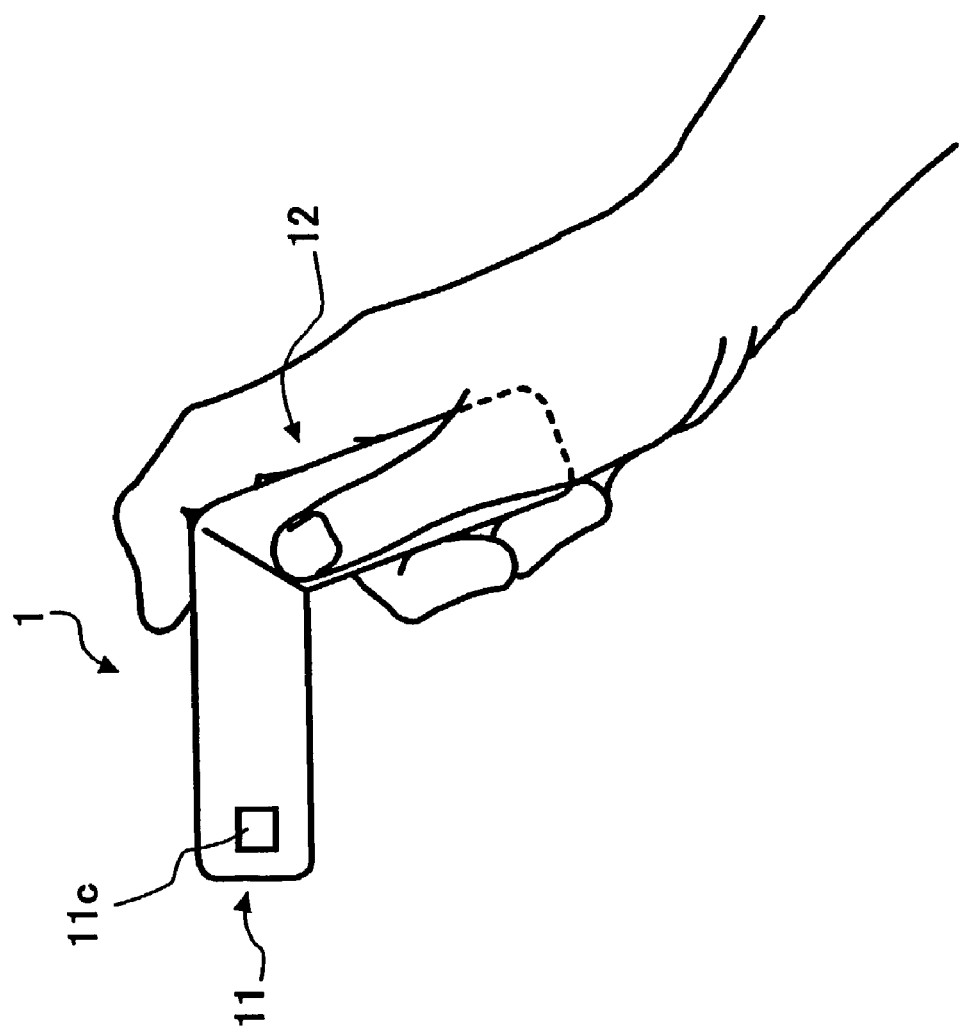
FIG. 8 is a diagram illustrating the state of gripping the camera with a different flexion angle.

In the above-described embodiment, the camera 1 is constructed such that the image photographing section 11 is almost horizontal and the griping section 12 is angled almost vertical, as illustrated in FIGS. 5 and 7. However, as illustrated in FIG. 8, the relative angle between the image photographing section 11 and the gripping section 12 may be set to an angle exceeding 90 degrees, while keeping the image photographing section 11 almost in the horizontal state, and setting the gripping section 12 in a state of being slightly inclined from the vertical state.

In order to attain the above-described state, it may be preferable to set the inclined angle of the combining surface between the image photographing section 11 and the gripping section 12 relative to the upper and lower surfaces of the camera 1 to an angle larger than 45 degrees and smaller than 90 degrees. In FIG. 8, the angle is 60 degrees. Probably, the range of 45–70 degrees may be practical. When the size of the camera 1 is excessively small and when the optical finder 11c and the strobe of the image photographing section 11 are located at the vicinity of the flexion/transformation mechanism 13, there arises a danger of covering the front part of the camera 1 with a finger, for instance, with the middle finger. However, as illustrated in FIG. 8, when the gripping section 12 is further inclined from the vertical state, the problem of covering the front portion of the strobe, etc. is avoided. In addition, the gripping section can be gripped further stably.

Figure 9:
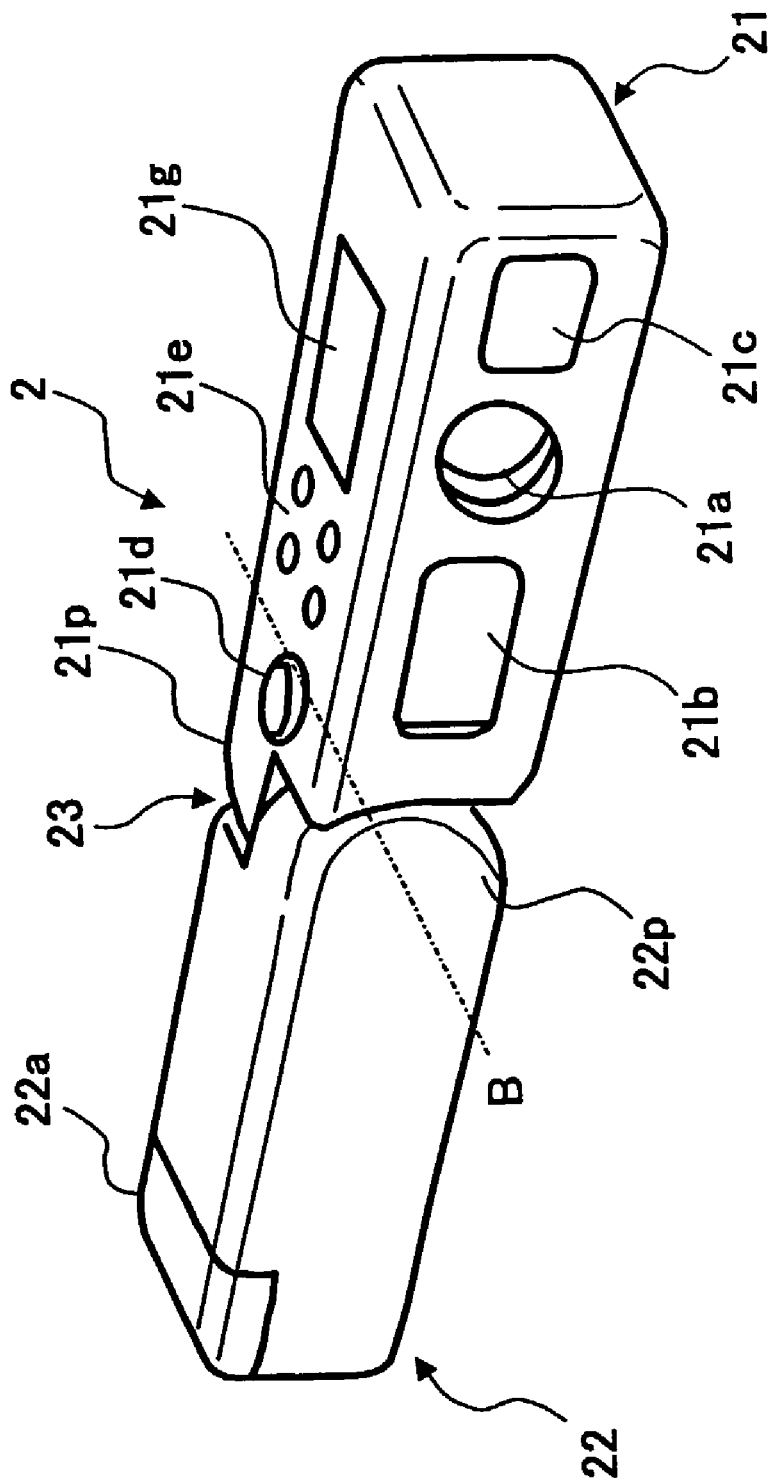
FIG. 9 is a perspective view of the camera as viewed at the front-surface side (subject side) of the camera, schematically illustrating the structure of the camera in the state of being carried, according to another preferred embodiment of the present invention.
Figure 10:
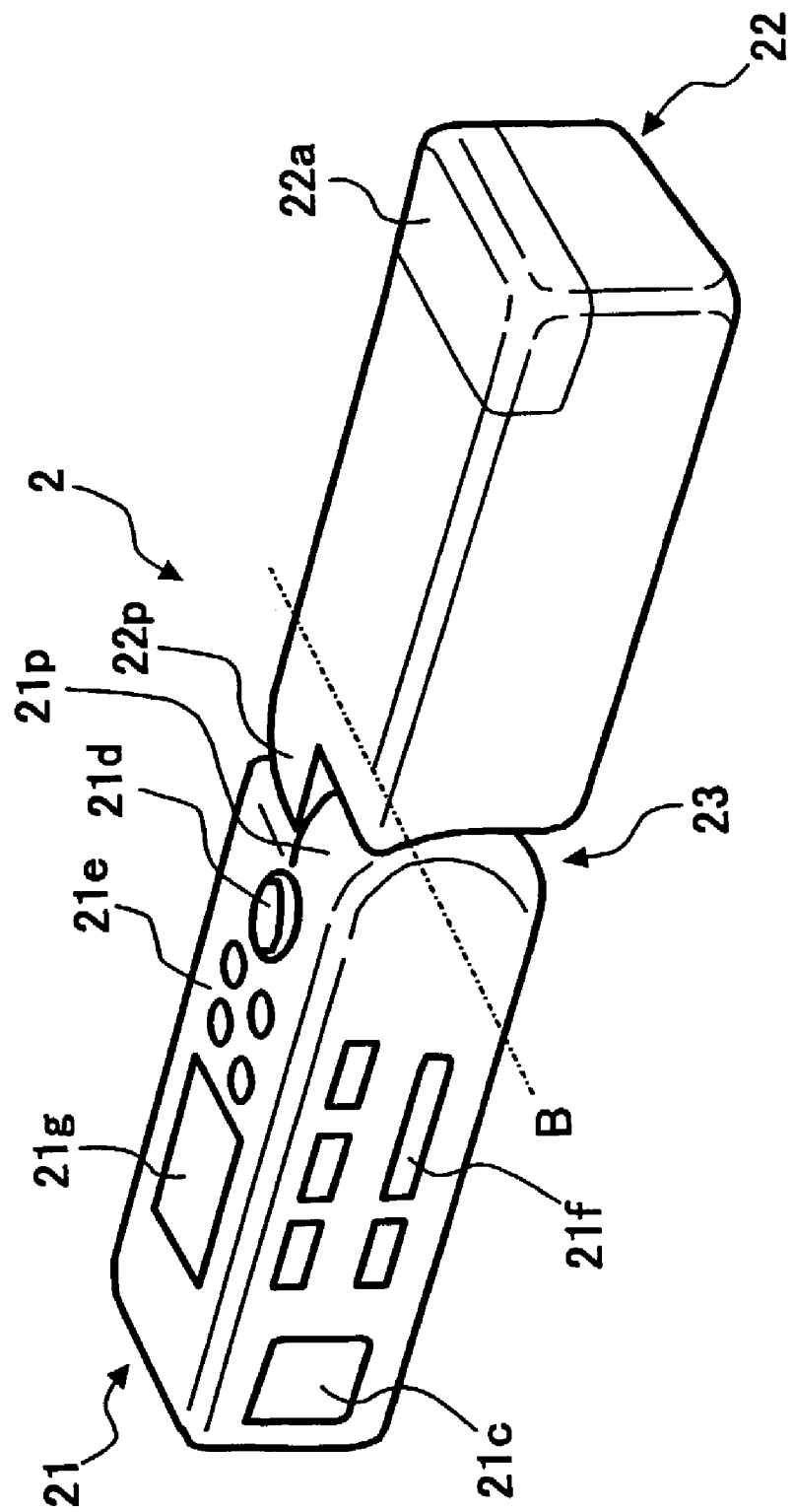
FIG. 10 is a perspective view of the camera of FIG. 9 as viewed at the back-surface side (photographer side) of the camera.
Figure 11:
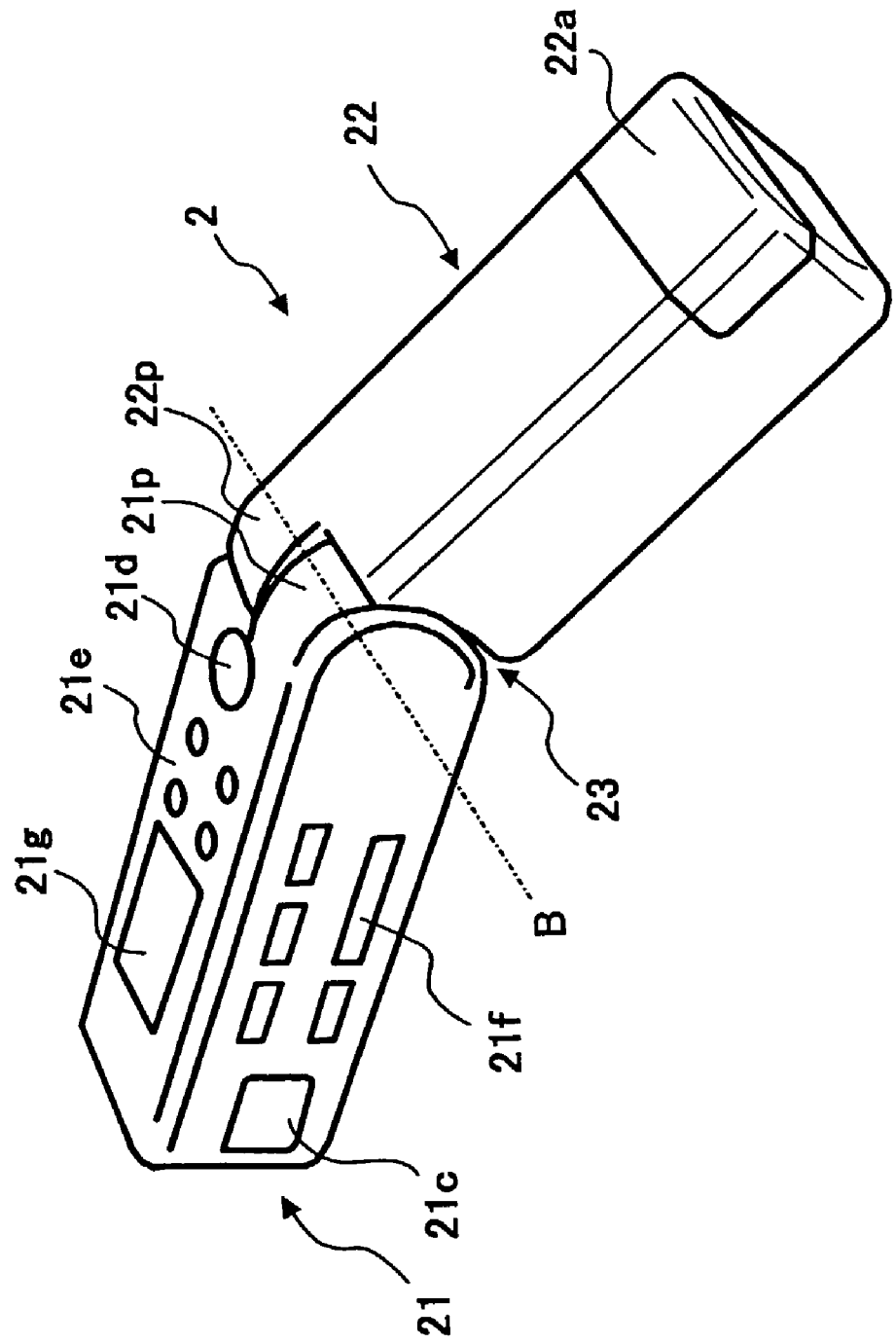
FIG. 11 is a perspective view of the camera as viewed at the back-surface side (photographer side) of the camera, illustrating the state of the camera on the halfway of being flexed.
Figure 12:
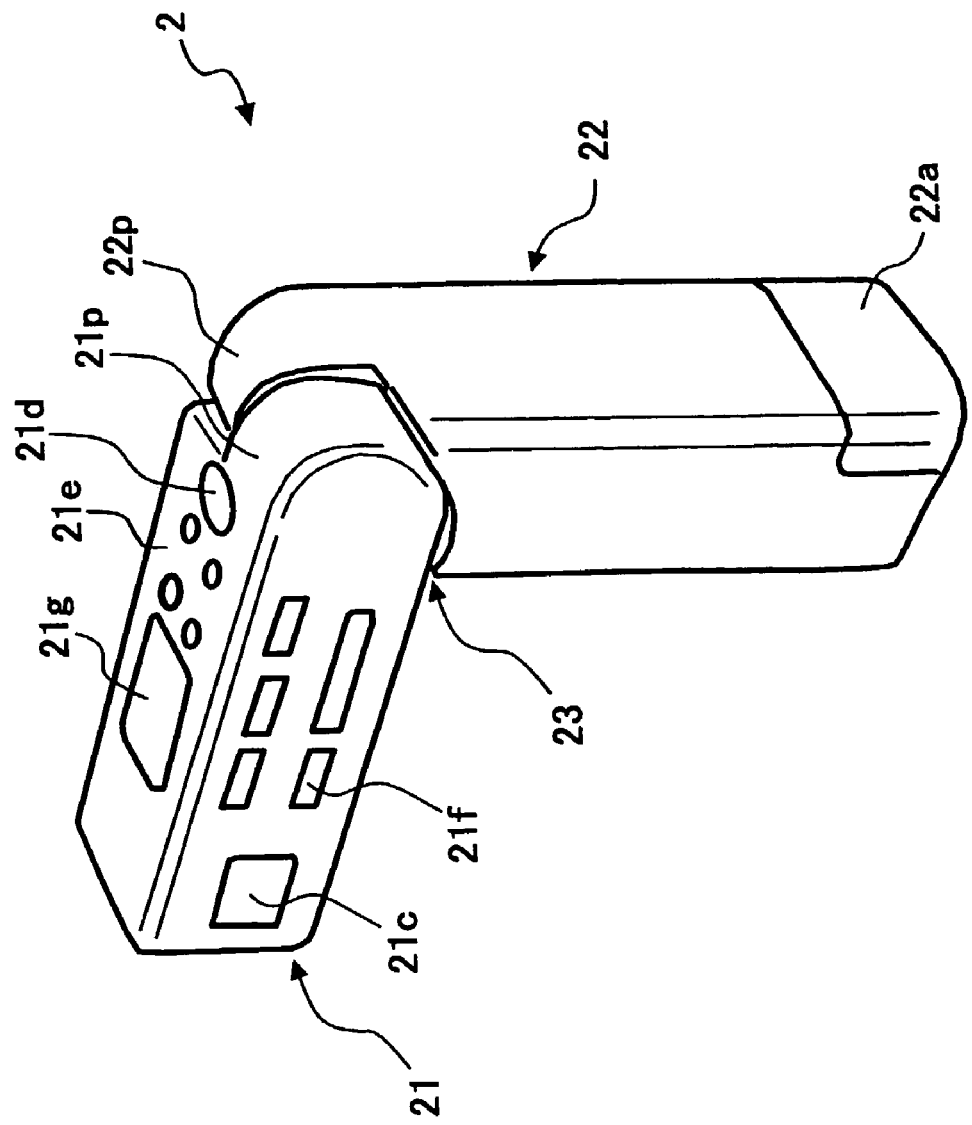
FIG. 12 is a perspective view of the camera as viewed at the back-surface side (photographer side) of the camera, illustrating the photographing state of the camera after having been flexed.

FIGS. 9 through 12 illustrate the structure of a camera according to another preferred embodiment of the present invention. FIG. 9 is a perspective view of the camera as viewed at the front-surface side of the camera, namely, at the subject side, schematically illustrating the structure of the camera in a carrying state thereof. FIG. 10 is a perspective view of the camera as viewed at the back-surface side of the camera, namely, at the photographer side. FIG. 11 is a perspective view of the camera as viewed at the back-surface side of the camera illustrating the state of the camera on the halfway of flexing the camera illustrated in FIG. 9. FIG. 12 is a perspective view of the camera as viewed at the back surface side of the camera in the state of photographing after having been flexed. In this embodiment, the electronic structure of the camera is substantially the same as that of FIG. 6.

A camera 2 illustrated in FIGS. 9 and 10 is, for instance, an electronic camera includes an image photographing section 21, a gripping section 22, and a flexion/transformation mechanism 23.

The image photographing section 21 is a part directly relating to photographing a subject image. The photographing section 21 includes a lens system 21a, a strobe light emitting section 21b, an optical finder 21c, a release button 21d, a mode button section 21e, an operating button section 21f, and a display section 21g. Furthermore, the main part of an electronic circuit of realizing the image photographing function is accommodated in the image photographing section 21.

The lens system 21a captures the optical image of the subject. The strobe light emitting section 21b radiates an illumination light onto the subject. The optical finder 21c is used for confirming the area of photographing visual field to be photographed by the lens system 21a with an optical image. The release button 21d is disposed on the upper surface side of the image photographing section 21 in the vicinity of the flexion/transformation mechanism 23, and instructs an image photographing timing by being depressed so that a release operation is performed. The mode button section 21e includes several buttons of the push button switch type. The mode button section 21e is used for selecting and setting of a photographing mode and an operation mode. The operating button section 21f includes various sorts of operation buttons, beside the mode button 21e, and is used for various operations besides the mode selection and setting. The display section 21g includes a liquid crystal display, and displays the operating state, the number of photographed subjects, the residual amount of the electricity in a battery, and the other operation states, resulting from the operations of the mode button section 21e and the operating button section 21f.

The gripping section 22 is a portion used as the grip for gripping the camera 2 at the time of photographing. The gripping section 22 accommodates a battery as the power source and a recording medium for recording a subject image. For this reason, a memory cover 22a for opening and closing at the time of setting and removing the recording medium is provided for the gripping section 22.

At the time of carrying, as illustrated in FIGS. 9 and 10, the image photographing section 21 and the gripping section 22 are linearly combined into one arranged in the shape of a quadrangular cylinder. The combining portions of the image photographing section 21 and the gripping section 22 have projecting portions 21p and 22p that project along respective side surfaces at end portions thereof, respectively having the thickness equally divided into two in the width direction thereof. Those projections 21p and 22p are connected with each other by closely bringing into contact with other respective side walls thereof facing knotch portions and parallel with the front and rear surfaces of the camera 2, as illustrated in FIGS. 9 and 10. A rotational connection mechanism substantially the same as the one of FIG. 3 capable of rotating around the axis line B parallel with the optical axis of the lens system 21a is provided at the surface where the side walls of the projections 21p and 22p contact each other, thus realizing a flexion/transformation mechanism 23.

With the above-described flexion/transformation mechanism 23, the image photographing section 21 and the gripping section 22 are combined and rotated around the axis (axis line B), and thereby the camera 2 can be flexed and transformed from a carrying state in which, as illustrated in FIGS. 9 and 10, the image photographing section 21 and the gripping section 22 are arranged on a same straight line such that the camera 2 is in a shape of an elongated quadrangular cylinder stick, to a photographing state in which, as illustrated in FIG. 12, the camera 2 is in a shape of an inverse "L". Namely, in the carrying state as illustrated in FIGS. 9 and 10, the camera 2 is in a shape of a stick so as to be suitable for being carried in a bag or for attaching a strap etc. thereto so that the camera 2 can be hung on the neck or the wrist instead of being carried in the bag. However, because it is difficult to perform a photographing operation in the carrying state, the photographing section 21 and the gripping section 22 are relatively rotated by use of the flexion/transformation mechanism 23. The rotational axis of the flexion/transformation mechanism 23 is the axis line B illustrated in FIGS. 9 through 11. When the gripping section 22 is rotated in the clockwise direction from the image photographing section 21 as illustrated in FIG. 10, the gripping section 22 is gradually angled relative to the photographing section 21 as illustrated in FIG. 11. When the gripping section 22 rotates by almost 90 degrees, the gripping section 22 becomes almost perpendicular to the photographing section 21 as illustrated in FIG. 12. In this state, as in the case of FIG. 7, by gripping the camera 2 with the right hand, for instance, the photographer can easily operate the release button 21d with the gripping right hand, while viewing at the window of the optical finder 21c.

For maintaining the aforementioned carrying state and photographing state even when there exists an external force, it may be preferable to provide a stopping mechanism such as a click stop mechanism, etc. for the flexion/transformation mechanism 23 on the position corresponding to the carrying state illustrated in FIGS. 9 and 10 and on the position corresponding to the photographing state illustrated in FIGS. 11 and 12. The electronic circuit system for operating the camera 2 illustrated in FIGS. 9 through 12 uses a structure substantially the same as that of the block diagram illustrated in FIG. 6.

The aforementioned gripping section 22 accommodates a battery employed as the power source and a recording medium installing section, and it is necessary to supply electricity to the image photographing section 21 and to exchange electric signals therebetween. Power supplying signal lines between the both photographing section 21 and the gripping section 22 can be inserted through a hollow portion of the flexion/transformation mechanism 23, although not illustrated in the relevant figures. A well-known movable conductive mechanism including a slip ring and a brush, etc. can be also used in the flexion/transformation mechanism 23.

Furthermore, the display section 21g may be capable of displaying an image, and may be configured to display a subject image before photographing or being photographed or to reproduce and display a photographed subject image stored in a recording medium. On this occasion, the subject image before photographing or being photographed, which is obtained by the image photographing element, is displayed on the image surface of the displaying section 21g, such that the displaying section 21g can be used as an electronic view finder.

Thus, the camera 2 can be made in the shape of a stick superior in the portability and having a preferable outer appearance suitable for being used as an accessory at the time of being carried. Further, the camera 2 can be flexed and transformed by the flexion/transformation mechanism 23 at the time of photographing, such that the image photographing section 21 is almost horizontal and the gripping section 22 is almost vertical. Therefore, the camera 2 has a configuration of an inverse "L", such that the camera 2 can be securely held by the photographer, with very low probability of being shaken.

Furthermore, the flexion angle formed by the flexion/transformation mechanism 23 can be optionally set easily. A desired angle other than the right angle can be set, for example, by regulating the flexion with the desired angle or by providing a click stop mechanism to set one or more desired angles. Furthermore, by configuring the gripping section 22 to stop at plural flexion angles, the flexion angle can be selectively set in accordance with a desired angle.

Furthermore, a twisting spring may be suspended over a curvature portion between the gripping section 22 and the image photographing section 21, so as to energize the gripping section 22 to move into the photographing state, and to move the gripping section 22 into the carrying state, while opposing against the above-described twisting spring, to be stopped by a stopping mechanism to maintain the carrying state.

With the above-described structure, when the camera 2 is in the carrying state, the gripping section 22 of the camera 2 can be gripped with the right hand, and the stopping state of the stopping mechanism can be released with the finger of the right hand, for instance, the thumb. Thus, according to the above-described embodiment of the present invention, a camera that can be operated by a single hand and that can be operated at a fast speed can be provided.

Furthermore, camera 2 may be configured such that the image photographing section 21 can be rotated, while the gripping section 22 is being held with the right hand, although not illustrated in the figures.

Namely, referring to FIG. 11 as an example, the camera 2 is constructed such that a knob capable of rotating the image photographing section 21 is provided on a portion of the projection 22p of the gripping section 22, and a part of the outer circumference of the knob protrudes from the surface of the projection 22p.

In such a structure, by griping the gripping section 22 of the camera 2 with the right hand, the knob can be rotated with the thumb of the right hand. Therefore, the configuration of the camera 2 can be easily changed from the photographing state to the carrying state or vice versa, thus improving usage convenience of the camera 2.

Figure 13:
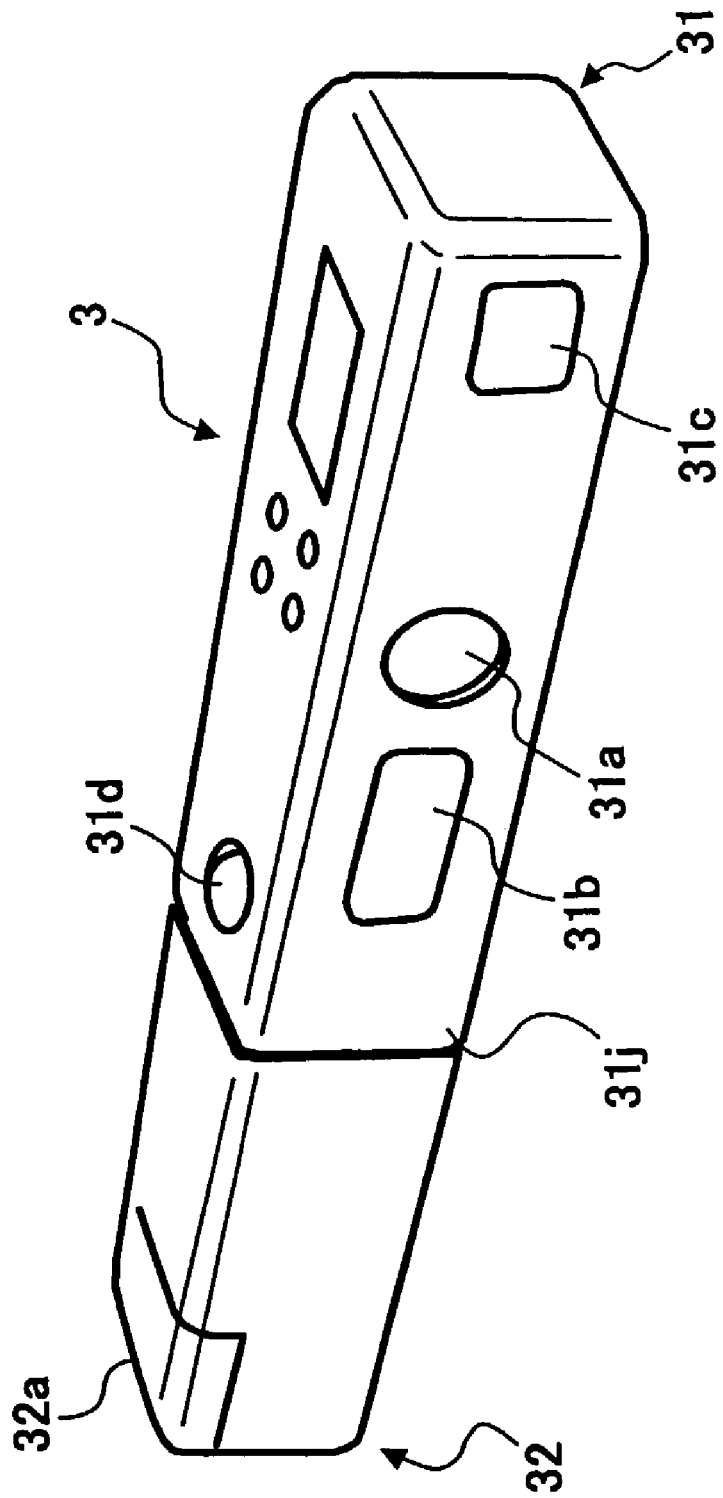
FIG. 13 is a perspective view of a camera as viewed at the front-surface side (subject side) of the camera, schematically illustrating the structure of the camera in the state of being carried, according to another preferred embodiment of the present invention.
Figure 14:
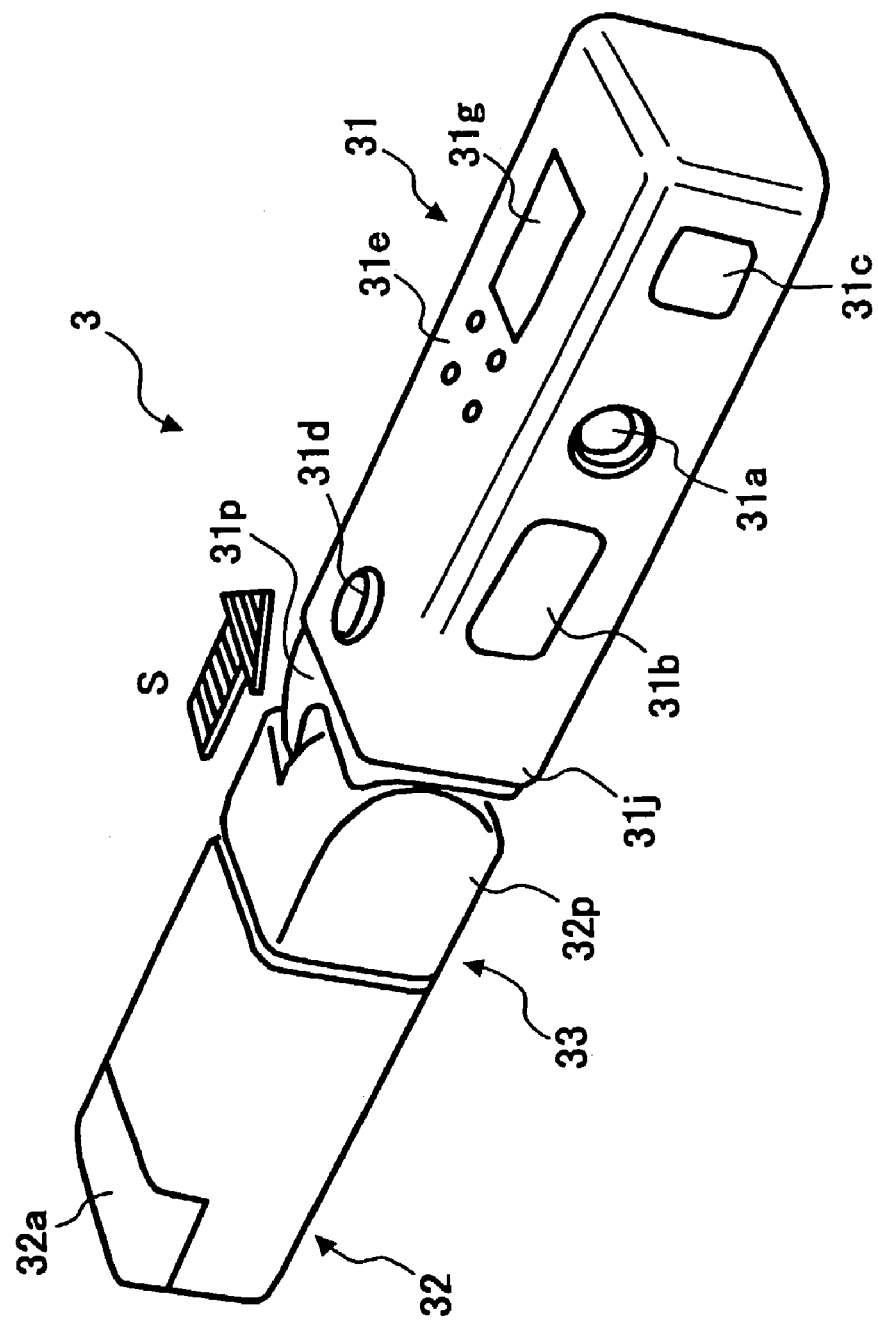
FIG. 14 is a perspective view of the camera of FIG. 13 as viewed at the front-surface side (subject side) of the camera when a barrier cover of a sliding type is slid for flexing the camera.
Figure 15:
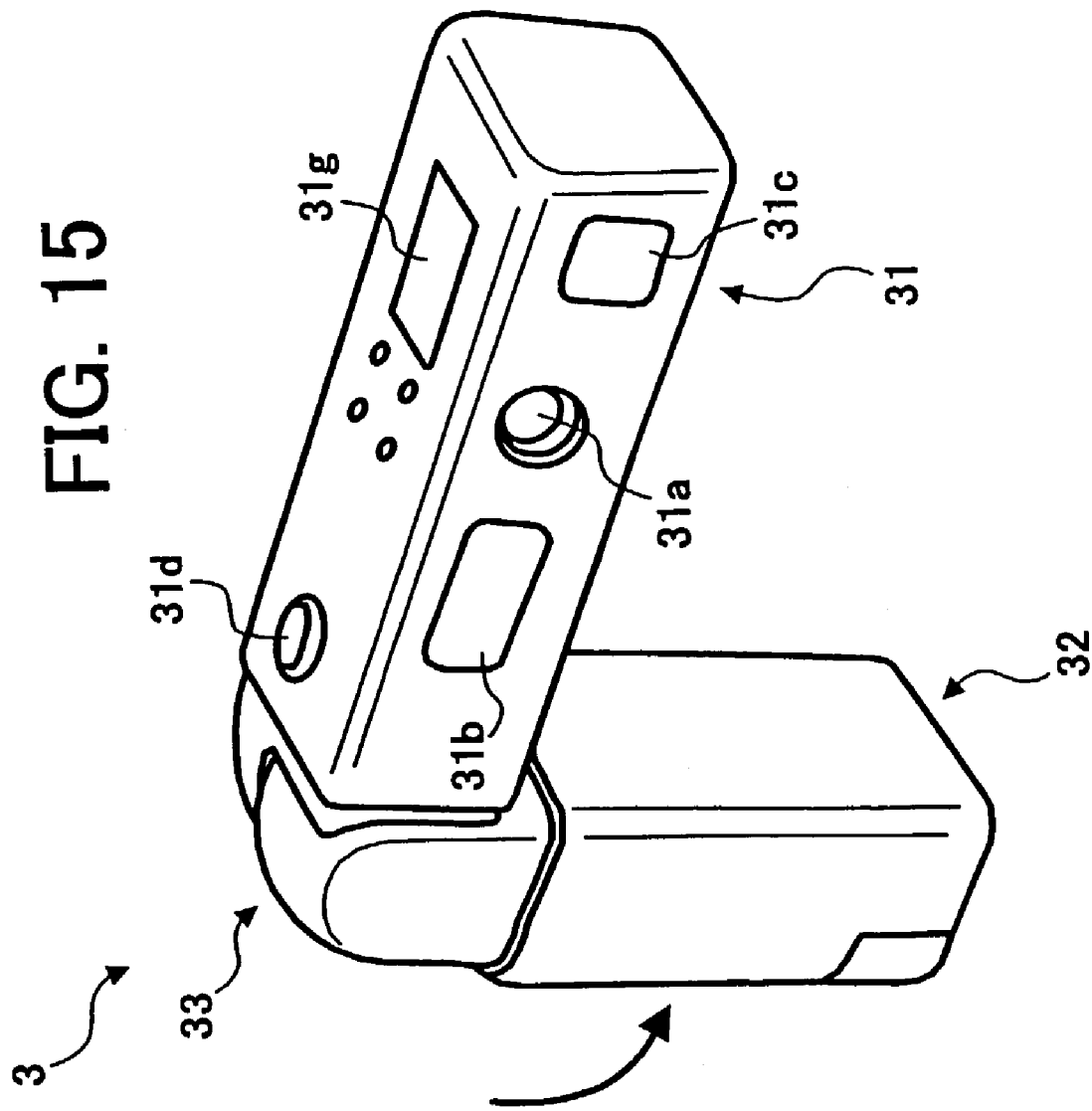
FIG. 15 is a perspective view of the camera as viewed at the front-surface side (subject side) of the camera, illustrating the photographing state of the camera after having been flexed.

FIGS. 13 through 15 illustrate the structure of a camera according to another embodiment of the present invention. FIG. 13 is a perspective view of the camera as viewed at the front-surface side, that is, the subject side illustrating a structure in the state of being carried. FIG. 14 is a perspective view of the camera as viewed at the front-surface side illustrating a state of starting flexion of the camera illustrated in FIG. 13. FIG. 15 is a perspective view of the camera as viewed at the front-surface side illustrating a state of photographing after having been flexed. The electronic structure of the camera is substantially the same as that of FIG. 6.

The camera of this embodiment uses the flexion/transformation mechanism of the previous embodiment illustrated in FIGS. 9 through 12. In the state of being carried, a slide cover for covering the entire portion of the image photographing section also covers the flexion/transformation mechanism section. Thereby, unintentional flexion due to a malfunction of the flexion/transformation mechanism can be prevented, and the convenience of carrying the camera is realized in addition to the improvement of an outer appearance. When putting the camera in the photographing state, the aforementioned slide cover is slid in a direction of the arrow S in FIG. 14, so that the flexion/transformation mechanism section is exposed and the restriction regulation thereof is released, and is bent as illustrated in FIG. 15. When the slide cover is slid, windows provided in the slide cover corresponding to the lens system and the strobe light emitting section are positioned where the lens system and the strobe light emitting section, etc. are seen through the windows, such that the lens system and the strobe light emitting section can be used.

A camera 3 illustrated in FIGS. 13 and 14 is, for instance, an electronic camera provided with an image photographing section 31, a gripping section 32, and a flexion/transformation mechanism 33.

The image photographing section 31 is the portion directly relating to photographing of a subject image. The photographing section 31 includes a lens system 31a, a strobe light emitting section 31b, an optical finder 31c, a release button 31d, a mode button section 31e, and a display section 31g. Furthermore, the main portion of an electronic circuit for realizing the image photographic function of the camera 3 is accommodated in the image photographing section 31. The lens system 31a captures an optical image of a subject. The strobe light-emitting section 31b radiates an illumination light onto the subject. The optical finder 31c is used for confirming the area of a visual field to be photographed by the lens system 31a. The release button 31d instructs a timing of photographing and performs a release operation by being operated. The mode button section 31e includes several push buttons of push button switches, and the mode button section 31e is used for selecting and setting a photographing mode and an operation mode, etc.

The camera 3 includes various sorts of operation buttons, besides the mode button 31e, as in the case of the previous embodiment illustrated in FIGS. 10 through 12, although not illustrated in FIGS. 13 through 15, and an operation button section used for various sorts of operations besides the mode selection and setting is further provided. The display section 31g includes an LCD (Liquid Crystal Display), etc., and the display section 31g displays the operating state of the mode button section 31e, the number of photographed subjects, the residual amount of battery electricity, and the other states of operation. The gripping section 32 is used as the grip for gripping the camera 3 at the time of photographing, and accommodates therein, for instance, a battery as the power source and a recording medium for recording the image of a subject. For this season, a memory cover 32a for opening and closing at the time of setting and removing the recording medium is provided.

In the carrying state, the image photographing section 31 and the gripping section 32 are linearly combined and arranged in the form of a quadrangular cylinder as illustrated in FIG. 13. The combining portions of the image photographing section 31 and the gripping section 32 have, as illustrated in FIG. 14, projecting portions 31p and 32p that project along respective side surfaces at end portions thereof, respectively having the thickness equally divided into two in the width direction thereof. Those projections 31p and 32p are connected with each other by closely bringing into contact with each other respective side walls thereof facing notch portions and parallel of with the front and rear surfaces facing of the camera 2, as illustrated in FIG. 14. A rotational connection mechanism almost same as the one of FIG. 3 capable of rotating around the axis line parallel with the optical axis of the lens system 31a is provided at surface where the side walls of the projections 21p and 22p contact each other, thus realizing the flexion/transformation mechanism 33.

With the above-described flexion/transformation mechanism 33, the image photographing section 31 and the gripping section 32 are combined and rotated around the axis line, and thereby the camera 2 can be flexed and transformed from a carrying state in which, as illustrated in FIG. 13, the image photographing section 31 and the gripping section 32 are arranged on a same straight line such that the camera 2 is in an elongated quadrangular cylinder stick, to a photographing state in which, as illustrated in FIG. 15, the photographing section 31 and the gripping section 32 are perpendicular to each other such that the camera 3 is in a shape of an inverse "L".

Furthermore, a slide cover 31j for covering the camera 3 is provided at the side of the image photographing section 31 such that in the carrying state where the photographing section 31 and the gripping section 32 are arranged in a straight line, the cover 31j covers the circumference of the camera 3 in the area from the image photographing section 31 to the flexion/transformation mechanism 33. The sliding cover 31j is capable of sliding to move in the area almost equal to the length of the flexion/transformation mechanism 33. Windows are provided in the sliding cover 31j such that in a state where the slide cover 31j has been moved in the direction of an arrow S so as to expose the flexion/transformation mechanism section 33, as illustrated in FIG. 14, the lens system 31a, the strobe light emitting section 31b and the display section 31g can be used. Because those windows do not correspond to respective positions of the lens system 31a, the strobe light emitting section 31b, and the display section 31g when the flexion/transformation mechanism 33 is pushed into and covered by the sliding cover 31j, the outer surface of the lens system 31a, the light emitting section 31b, and the display section 31g are covered and protected by the slide cover 31j as illustrated in FIG. 13.

Because the optical finder 31c is situated at the tip end of the image photographing section 31 in the case of FIG. 13, the optical finder 31c cannot be opened and closed by the sliding cover 31j. Therefore, an object lens section and an eye lens section are respectively formed as thinly as possible, so as to be integrally provided at the walls at the both sides of the slide cover 31j. Needless to mention, if the positional relationship is allowed, even the optical finder 31c can be opened and closed by the slide cover 31j.

Furthermore, the release button 31d and the mode setting button section 31e, etc. are constructed such that respective internal structures are connected with the buttons on the slide cover 31j in the state where the flexion/transformation mechanism 33 section has been exposed, as illustrated in FIG. 14. The release button 31d, the mode setting button section 31e, and the display section 31g, etc. may be thinly formed so as to be integrally provided with the slide cover 31j. In this case, it may be configured such that, on-off-operations of a part or all of the functions of those units 31d, 31e, and 31g can be controlled in cooperation with a sliding operation of the slide cover 31j, so as to prevent an erroneous operation in the carrying state.

Furthermore, it may be preferable that a step is formed on the boundary area between the flexion/transformation mechanism 33 section covered by the slide cover 31j in the carrying state and the other sections of the gripping section 32, so that as illustrated in FIG. 13, the outer surfaces of the slide cover 31j and the outer surface of the gripping section 32 smoothly continue. Furthermore, in the state where the flexion/transformation mechanism 33 is pushed into the slide cover 31j, the flexion/transformation mechanism 33 is locked, so as not to function. Therefore, the camera 3 cannot be flexed. Owing to such a mechanism, there occurs no flexion/transformation in the camera 3 due to a outside force in the carrying state. Furthermore, it is desirable that a strap, etc. is mounted on a button portion of the gripping section 32 (the left-edge surface of the gripping section 32 in FIG. 13).

Thus, in the carrying state illustrated in FIG. 13, the camera 3 is in the shape of a stick. Therefore, the camera 3 is suitable for being carried in a bag or being hung around a neck or a wrist. When photographing, the slide cover 31j is moved in the direction of the arrow S in FIG. 14, so that the locked state of the flexion/transformation mechanism 13 is released. Then, the image photographing section 31 and the gripping section 32 can be rotationally moved relatively to each other by the flexion/transformation mechanism 33.

The rotation axis of the flexion/transformation mechanism 33 is parallel with the optical axis of the lens system 31a as the axis line B illustrated in FIGS. 9 through 11. When the gripping section 32 is rotated in the counterclockwise direction from the image photographing section 31 in FIG. 14, the gripping section 32 becomes almost perpendicular to the image photographing section 31 when the gripping section 32 has been rotated by at almost 90 degrees, as illustrated in FIG. 15. In this state, as in the case of FIG. 9, by gripping the gripping section 32 with the right hand, the release button 31d can be easily handled with the griping right hand, while viewing the window of the optical finder 31c.

For maintaining the above-described photographing state even when there exists an external force, it may be desirable to provide a stopping mechanism, such as a click stop mechanism, etc. for the flexion/transformation mechanism 33 at the position corresponding to the photographing state illustrated in FIG. 15. The electronic circuit system for operating the camera. 3 illustrated in FIGS. 13 through 15 uses a structure substantially the same as that illustrated in FIG. 6.

The gripping section 32 accommodates a battery used as the power source and a recording medium installing section, and therefore it is necessary to supply electricity to the image photographing section 31 and to exchange electric signals therebetween. Power supplying/signal lines between the photographing section 31 and the gripping section 32 can be inserted through a hollow portion of the flexion/transformation mechanism 33, although not illustrated in the relevant figures. Needless to mention, it may be allowable to use a well-known slip ring and slidable conductive mechanism such as a brush, etc. in the flexion/transformation 33.

Further, the display section 31g can be capable of displaying an image, so that a subject image before photographing or being photographed can be displayed by use of the display section 31g, or that a photographed subject image stored in a recording medium is reproduced and displayed. On this occasion, the subject image before photographing or being photographed by an image photographing element is displayed on an image surface of the displaying section 31g, thus using the displaying section 31g as an electronic view finder.

Furthermore, in the above-described structure, the main portions of the flexion/transformation mechanism 33 and the image photographing section 31 are inserted into the slide cover 31j.

However, the slide cover 31jb may be configured to be integrated with the image photographing section 31 such that only the flexion/transformation mechanism 33 section is inserted into the slide cover 31j by the slide movement of the slide cover 31j. In this case, if a cover for the lens system 31a, etc. is required, the cover may be provided to the photographing section 31 as an exclusive cover member for opening and closing in cooperation with the operation of the slide cover 31j.

By constructing a camera as described above, the camera can be made in the shape of a stick, superior in the portability and suitable in the outer appearance for being carried as an accessory. Further, at the time of photographing, the camera can be flexed and transformed by the flexion/transformation mechanism 33, such that the image photographing section 31 is almost horizontal and the gripping section 32 is almost vertical, forming an inverse "L" shape enabling the secure holding of the camera by the photographer and causing very low probability of being hand shaken.

Furthermore, the flexion angle formed by the flexion/transformation mechanism 33 can be optionally set easily. For example, by regulating flexion of the flexion/transformation mechanism 33 at a desired angle or by setting one or more desired angles by use of a click stop mechanism, etc., it may be possible to set the flexion angle to a desired angle besides a right angle. Furthermore, by configuring the gripping section 21 to be stopped at plural flexion angles, the flexion angle can be selectively set in accordance with the desired angle.

Figure 16:
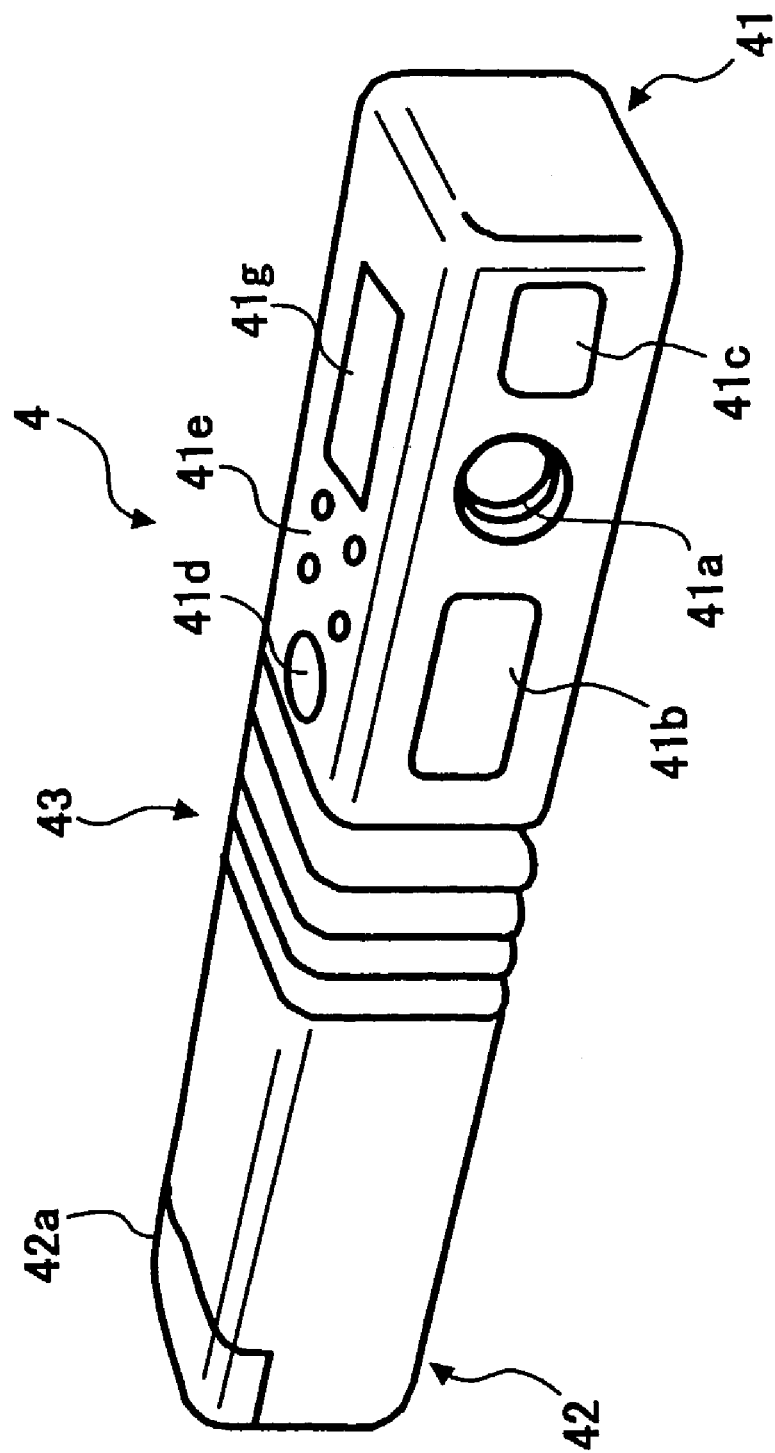
FIG. 16 is a perspective view of the camera as viewed at the front-surface side (subject side) of the camera, schematically illustrating the structure of the camera in the state of being carried, according to another preferred embodiment of the present invention.
Figure 17:
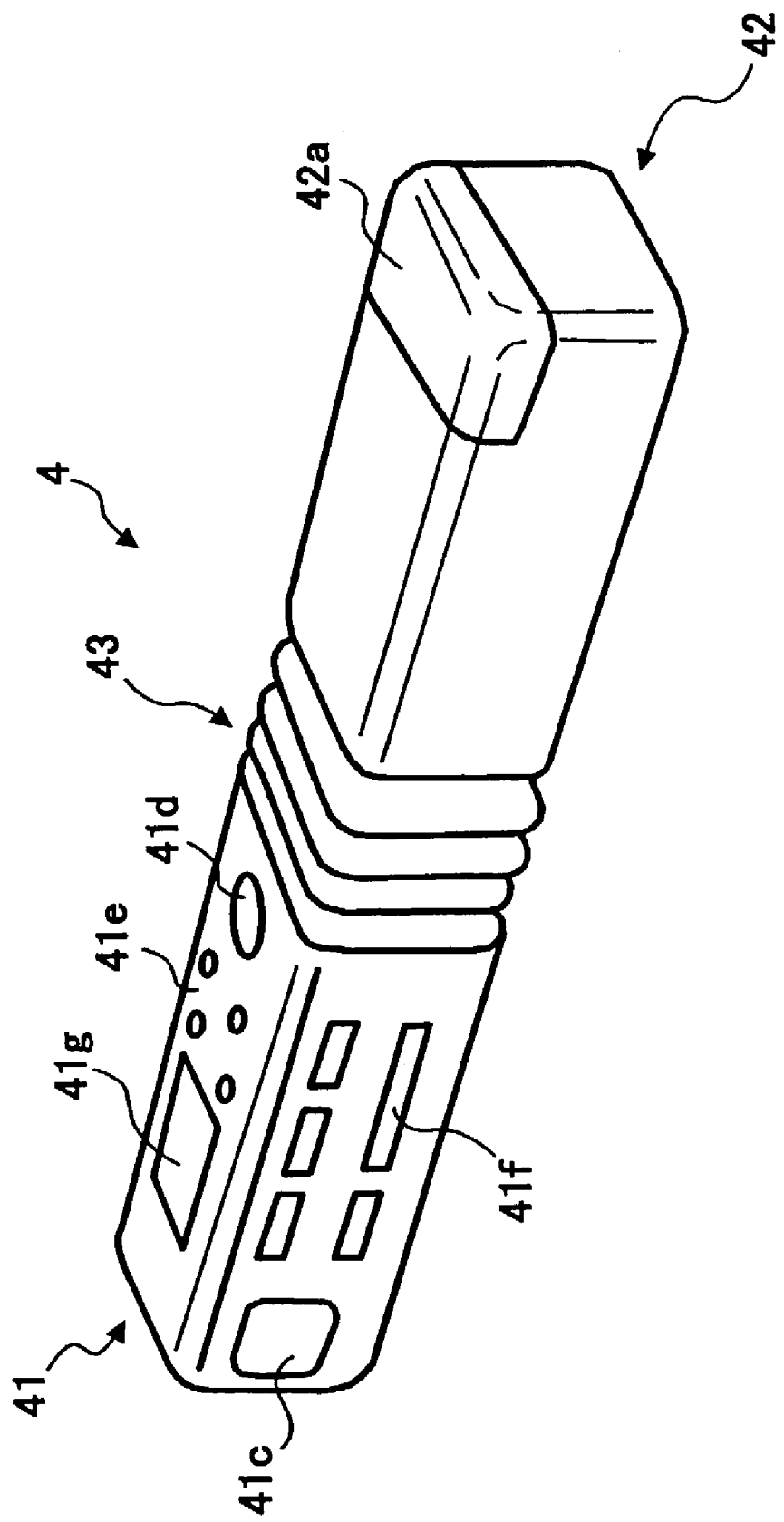
FIG. 17 is a perspective view of the camera of FIG. 16 as viewed at the back-surface side (photographer side) of the camera.
Figure 18:
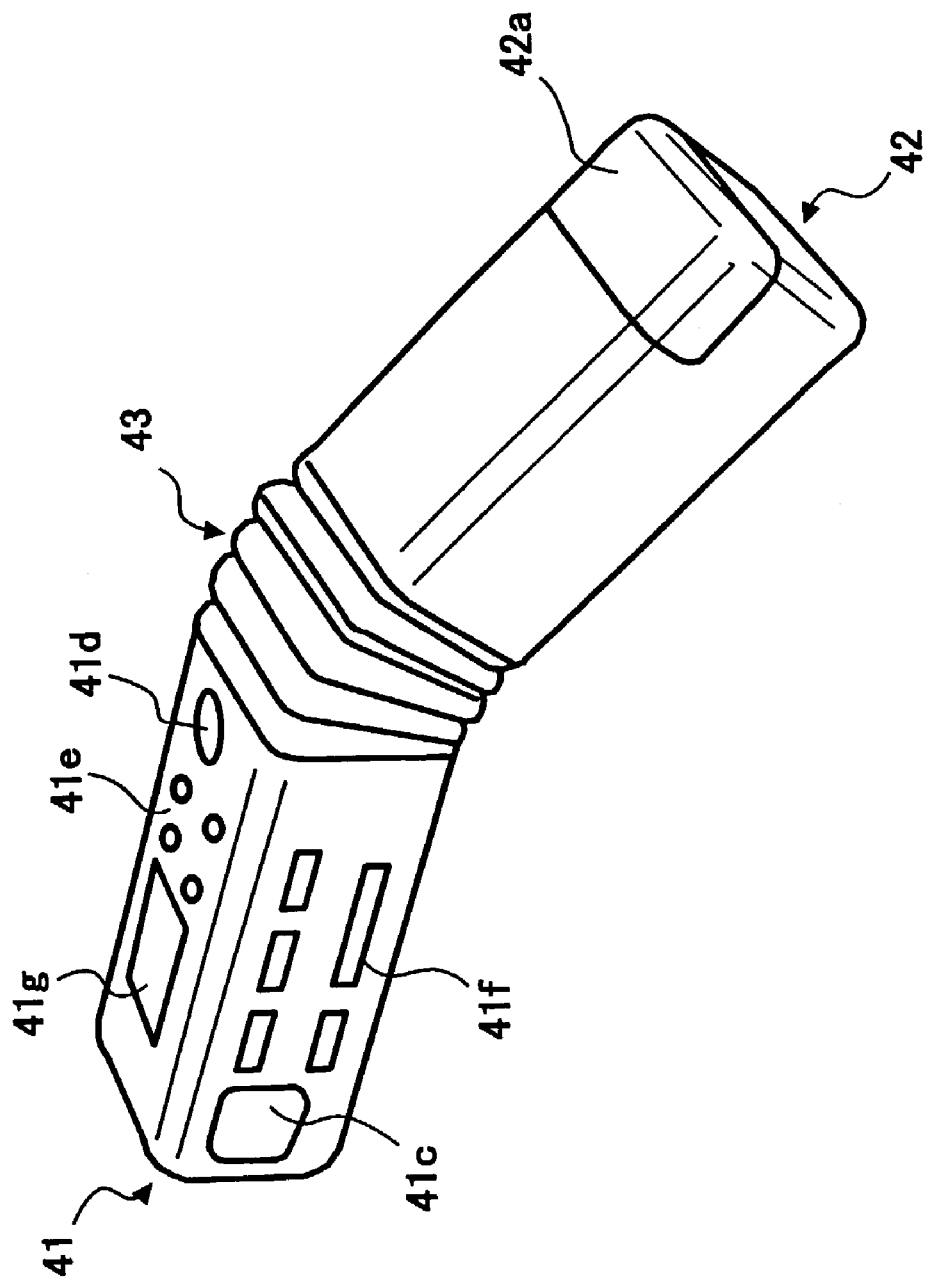
FIG. 18 is a perspective view of the camera as viewed at the back-surface side (photographer side) of the camera, illustrating the state of the camera on the halfway of being flexed.
Figure 19:
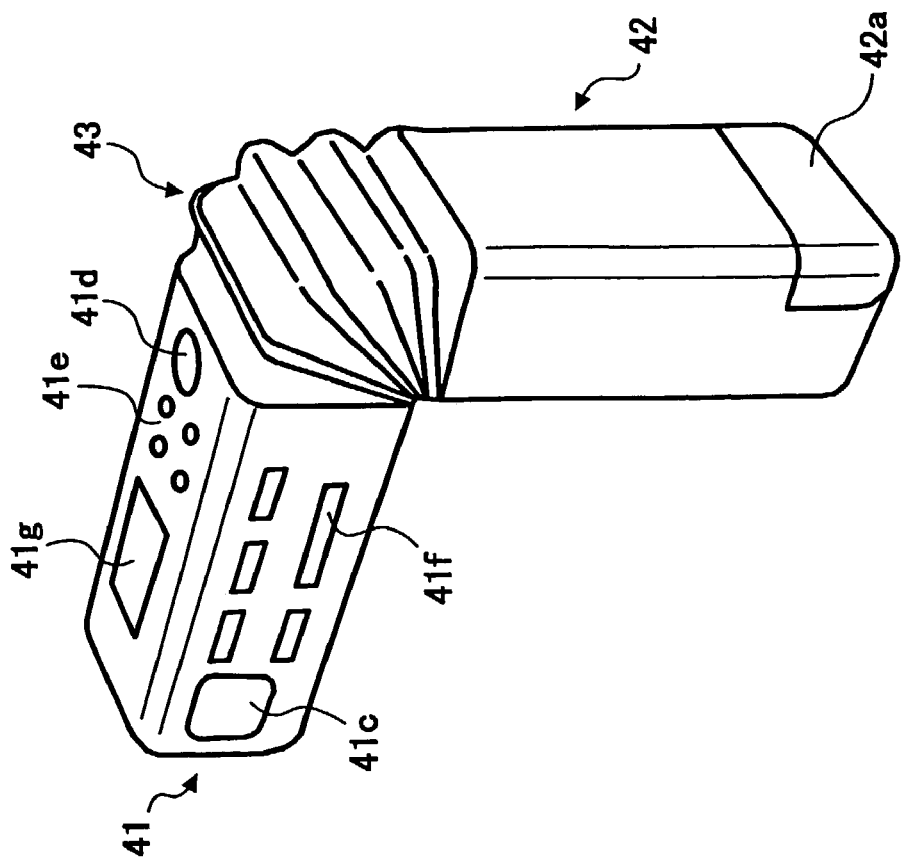
FIG. 19 is a perspective view of the camera as viewed at the back-surface side (photographer side) of the camera, illustrating the photographing state of the camera after having been flexed.

FIGS. 16 through 19 illustrate a structure of a camera according to another preferred embodiment of the present invention. FIG. 16 is a perspective view of the camera as viewed at the front-surface side thereof, that is, the subject side, illustrating a structure in a state of being carried. FIG. 17 is a perspective view of the camera illustrated in FIG. 16 as viewed at the back-surface side thereof, that is, the photographer side. FIG. 18 is a perspective view of the camera as viewed at the back-surface side thereof, illustrating a state of the camera on the halfway of being flexed. FIG. 19 is a perspective view of the camera as viewed at the back-surface side thereof, illustrating a state of the camera after having been flexed. In this embodiment also, the electronic structure of the camera is substantially same as that of FIG. 6. A camera 4 illustrated in FIGS. 16 and 17 is, for instance, an electronic camera. The camera 4 is provided with an image photographing section 41, a gripping section 42 and a flexion/transformation mechanism 43.

The image photographing section 41 is mainly the part directly relating to photographing of a subject image. The section 41 includes a lens system 41a, a strobe light emitting section 41b, an optical finder 41c, a release button 41d, a mode button section 41e, an operation button 11f, and a display section 41g. Furthermore, the main part of the electronic circuit for realizing the image photographing function of the camera 4 is accommodated in the image photographing section 41. The lens system 41a captures an optical image of the subject. The strobe light emitting section 41b radiates an illumination light onto the subject. The optical finder 41c is used for confirming the visual field of the image to be photographed by the lens system 41a with the optical image.

The release button 41d instructs the timing of image photographing by being operated, and a release operation is performed at that time. The mode button section 41e includes one or more buttons such as push buttons. These buttons are used in selection and setting operations of a photographing mode and various sorts of operation modes, etc.

The operation button section 41f includes various sorts of operation buttons, etc. besides the mode button 41e, and the operation button section 41f is used for various sorts of operations besides the mode selection and setting operations. The display section 41g includes an LCD (Liquid Crystal Display), etc., and the display section 41g displays the operation states as a result of the operations of the mode button section 41e and the operation button section 41f, the number of photographed subjects, the residual quantity of electricity in a battery, and the other operation states of the camera 4.

The gripping section 42 is the part used as the grip for gripping the camera 4 at the time of photographing. The gripping section 42 accommodates, for instance, a battery as the power source and a recording medium for recording an image of a subject. Typically, the recording medium is the one using therein a flash memory, such as a multi-media card, a SD card, a smart media, a compact flash memory, and a memory stick, etc. For this reason, the gripping section 42 is provided with a memory cover 42a opening and closing at the time of setting and removing the recording medium.

As illustrated in FIG. 16 and FIG. 17, when the camera 4 is carried, the image photographing section 41 and the gripping section 42 are linearly connected with each other and arranged so as to form a quadrangular cylindrical body. The flexion/transformation mechanism 43 is interposed between the image photographing section 41 and the gripping section 42. The flexion/transformation mechanism 43 has an outer appearance just like bellows and is flexibly deformable. The flexion/transformation mechanism 43 includes a member capable of holding the carrying state of the camera 4 against an external force applied to the camera in the carrying state.

The image photographing section 41 and the gripping section 42 are connected with each other with the flexion/transformation mechanism 43, and by flexing the flexion/transformation mechanism 43, the camera 4 can be flexed and transformed between the carrying state illustrated in FIG. 16 and FIG. 17, in which the photographing section 41 and the gripping section 42 are arranged on the same straight line such that the camera 4 is formed in the shape of quadrangular cylinder stick, to the photographing state as illustrated in FIG. 19, in which the image photographing section 41 and the gripping section 42 are almost perpendicular to each other such that the photographing section 41 and the gripping section 42 forms the shape of a reverse "L".

Namely, in the carrying state illustrated in FIG. 16 and FIG. 17, the camera 4 is in the stick state, and therefore is suitable for being carried in a bag, etc. or for attaching a strap thereto so as to be hung around the neck or the wrist. In photographing, because it is difficult to photograph with the camera 4 in the carrying state, the camera 4 is relatively flexed by use of the flexion/transformation mechanism 43. By rotating the gripping section 42 in the clockwise direction as illustrated in FIG. 17 relative to the image photographing section 41, the gripping section 42 is gradually angled relative to the image photographing section 41 as illustrated in FIG. 18. Finally, at the time of rotating by almost 90 degrees, the gripping section 42 becomes perpendicular to the image photographing section 41 as illustrated in FIG. 19.

In this state, as illustrated in FIG. 7, for instance, by gripping the gripping section 42 with the right hand, the photographer can easily operate the release button 41d with the gripping right hand, while viewing the window of the optical finder 41C.

For optimizing the flexion state, the flexing direction, and the restoring position of the flexion/transformation mechanism 43, the flexing direction may be regulated so as to be on the same plain surface. Further, the flexion/transformation mechanism 43 may be configured such that the flexion state is stopped and held in respective states, i.e., in the carrying state in which the image photographing section 41, the flexion/transformation mechanism 43, and the gripping section 42 are aligned on a straight line, and in the photographing state in which the image photographing section 41 becomes almost perpendicular to the gripping section 42. The electronic circuit system for operating the camera 4 illustrated in FIGS. 16 through 19 utilizes a structure almost same as that of FIG. 6.

The aforementioned gripping section 42 accommodates a battery as the power source and a recording medium installing section, etc. The gripping section 42 supplies electricity to the image photographing section 41, and electric signals are exchanged between the photographing section 41 and the gripping sections 42. The power supply/signal lines can be inserted into the interior of the flexion/transformation mechanism 43 although not illustrated.

Furthermore, the displaying section 41g may be capable of displaying a image. The displaying section 41g displays a subject image before photographing or a subject image being photographed, or a photographed subject image stored in a recording medium, etc. On this occasion, the subject image obtained by the image photographing element is displayed on the image surface of the display section 41g, such that the display section 41g is used as an electronic view finder.

By thus structuring a camera as described above, when carrying the camera, the camera can be put in the shape of a stick, superior in the portability and suitable in the outer appearance for being used as an accessory, and when photographing, the camera can be flexed and transformed by the flexion/transformation mechanism 43, such that the image photographing section 41 is almost horizontal while the gripping section 42 is almost vertical, thus forming a reverse L-shape. Thereby, the camera can be held surely. In addition, there is almost no danger of instability caused by a shaky hand because of the adoption of a reverse L-shape.

Furthermore, the flexion angle can be easily set optionally to a desired angle other than the right angle with the flexion/transformation mechanism 43. For example, by regulating the flexion of the flexion/transformation mechanism at the desired angle, or by setting one or more required angles by use of a click stop mechanism, etc., the flexion angle can be set to the desired. Further, by configuring the gripping section 42 so as to be stopped at plural flexion angles, the flexion angle can be also selectively set.

The present invention has been described with respect to several embodiments, in which the present invention has been applied to cameras. However, the present invention is not limited to the cameras. The present invention can be also applied to other image inputting apparatuses, for instance, image inputting apparatuses configured to be suitable for macro photographing so that the apparatuses can be used as devices for inputting to computers such as PCs or portable information terminals, or other image inputting apparatuses configured to photograph video images for a short time for inputting to PCs or portable information terminals. Those image inputting apparatuses can be constructed in substantially the same manner as the cameras according to the preferred embodiments of the present invention described above.

Furthermore, the present invention can apply when incorporating the above-described function of the cameras and the image inputting apparatuses in portable terminals, such as a portable telephone terminal or a portable information terminal, etc. An example of applying the present invention to the portable telephone terminal is described below.

Figure 20:
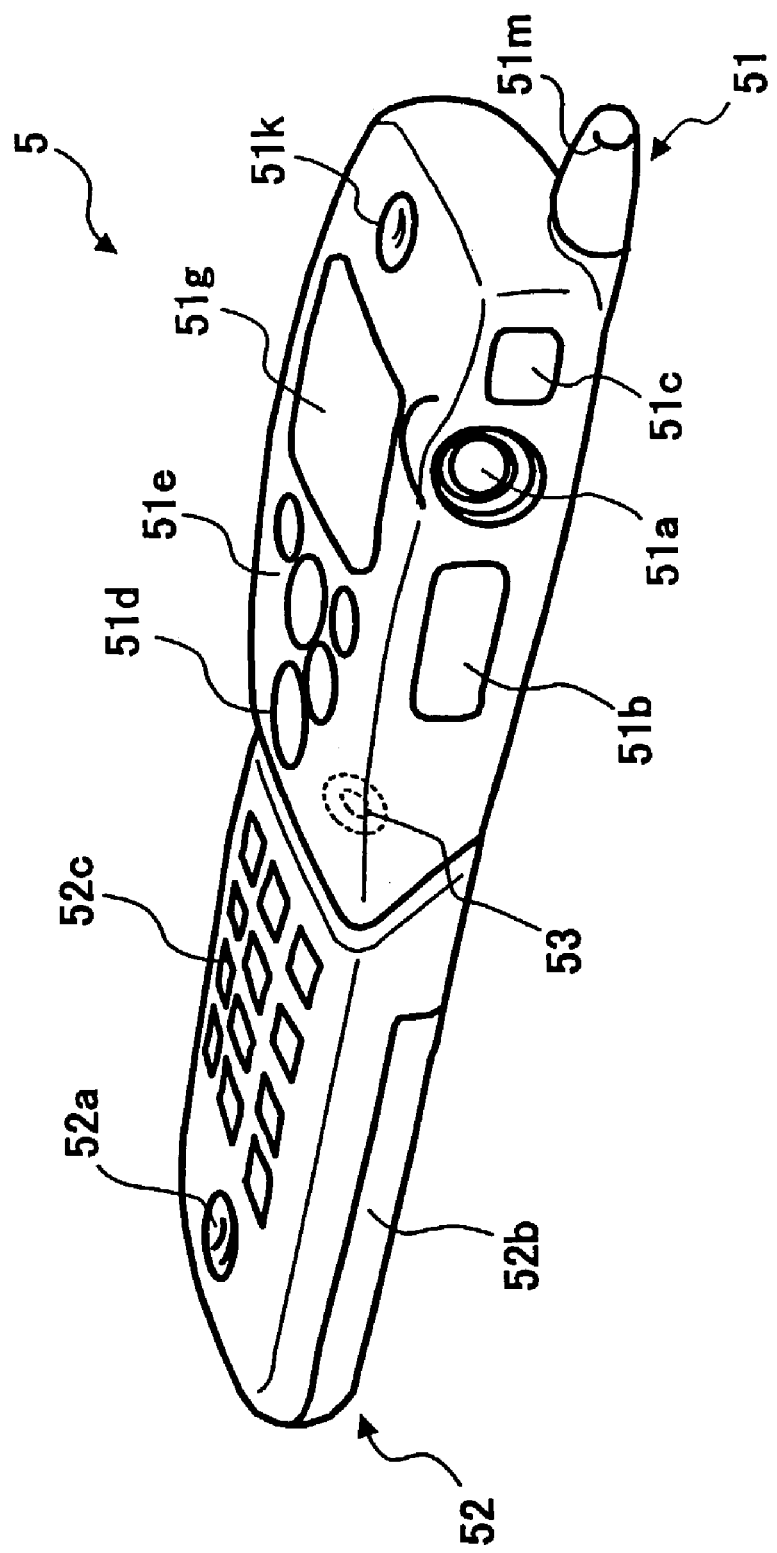
FIG. 20 is a perspective view of a portable telephone terminal as viewed at the subject side of the terminal, schematically illustrating the structure of the terminal in the state of being carried, according to another preferred embodiment of the present invention.
Figure 21:
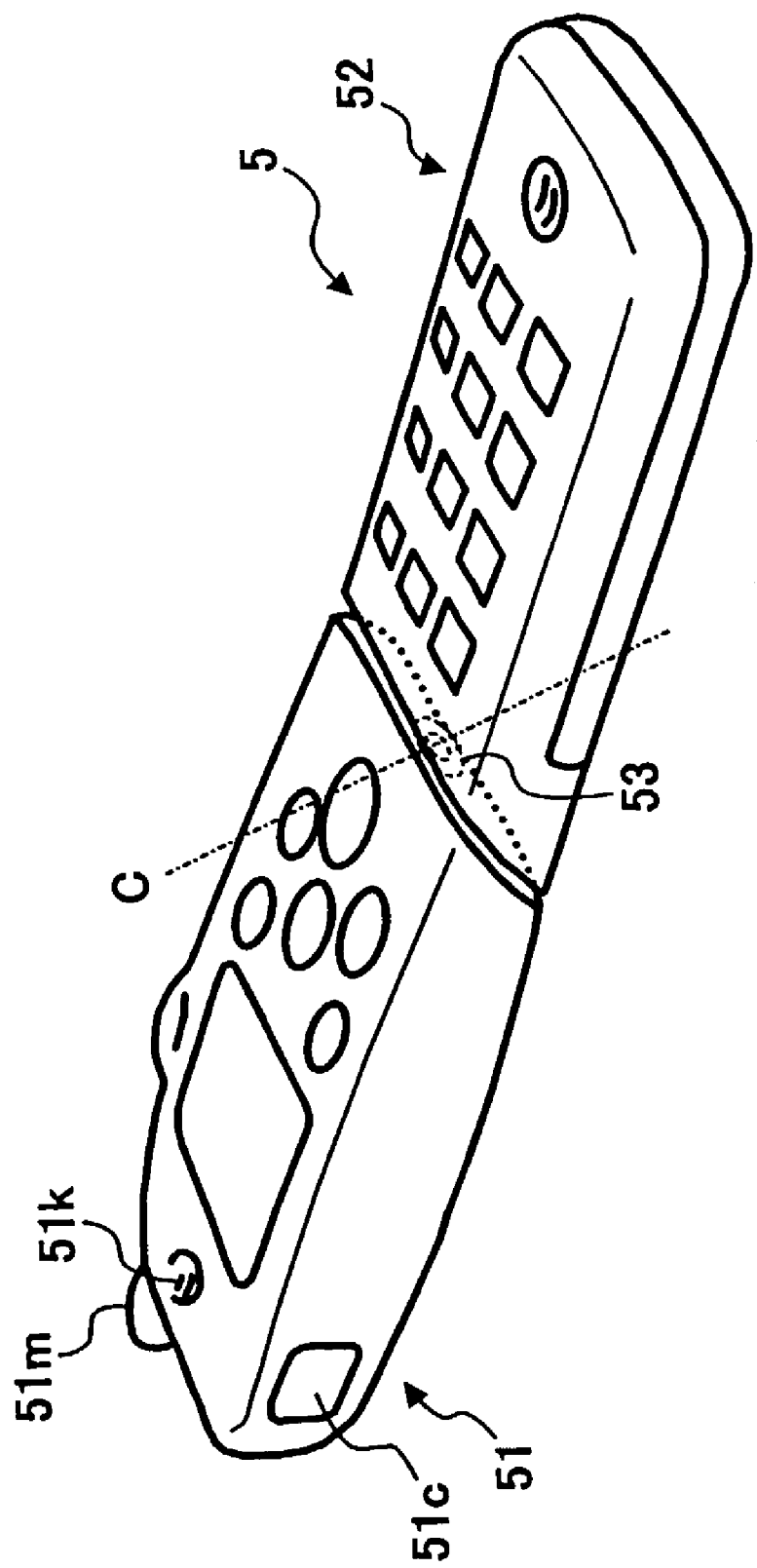
FIG. 21 is a perspective view of the portable telephone terminal of FIG. 20 as viewed at the photographer side of the terminal.
Figure 22:
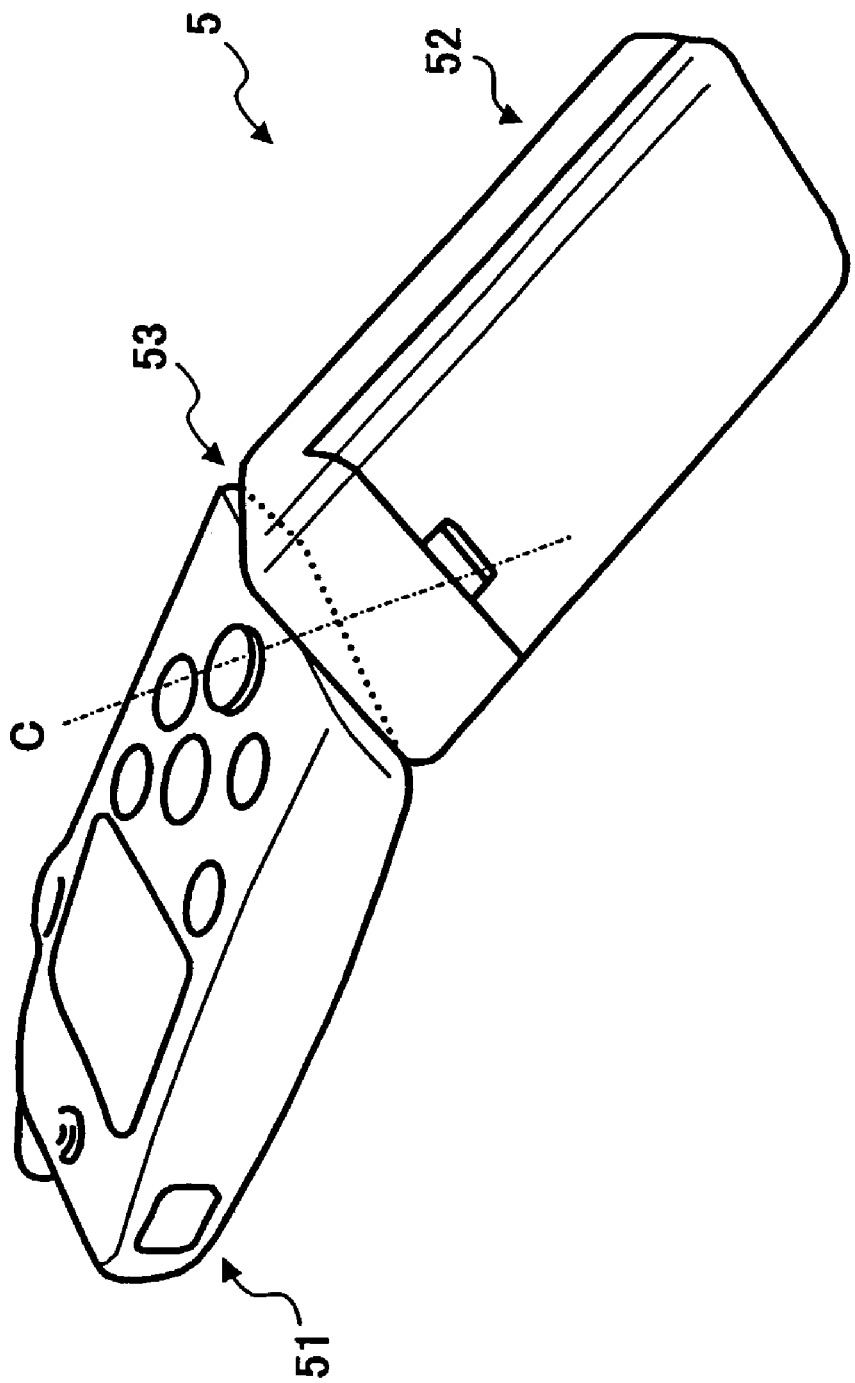
FIG. 22 is a perspective view of the portable telephone terminal as viewed at the photographer side, illustrating the state of the portable telephone terminal on the halfway of being flexed.
Figure 23:
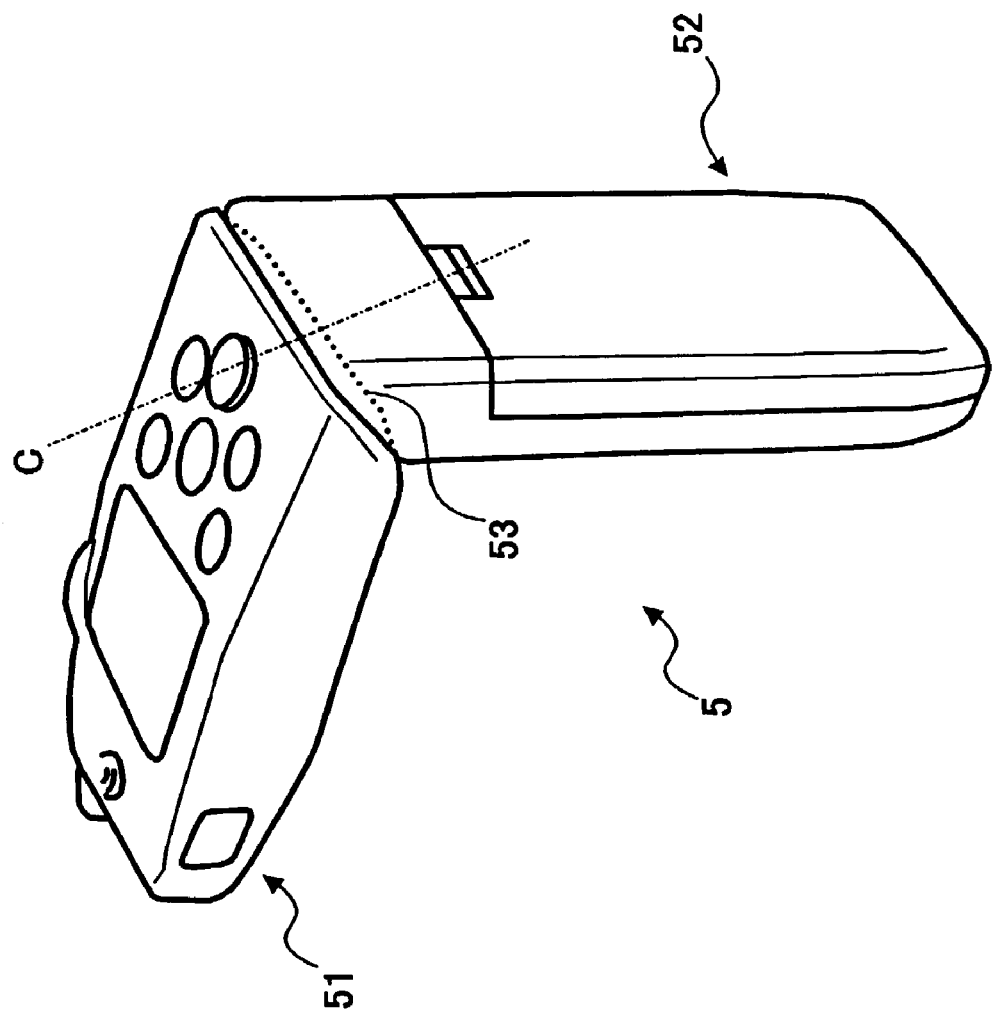
FIG. 23 is a perspective view of the portable telephone terminal as viewed at the photographer side of the terminal, illustrating the photographing state of the terminal after having been flexed.

FIGS. 20 through 23 illustrate a structure of a portable telephone terminal incorporating the camera function according to another preferred embodiment of the present invention. FIG. 20 is a perspective view as viewed at the subject side, schematically illustrating the structure of the portable telephone terminal in the state of being carried. FIG. 21 is a perspective view of the portable telephone terminal illustrated in FIG. 20 as viewed at the photographer side. FIG. 22 is a perspective view of the portable telephone terminal as viewed at the photographer side, illustrating the state of the portable telephone terminal halfway flexed. FIG. 23 is a perspective view of the portable telephone terminal as viewed at the photographer side after having been flexed. In this embodiment also, the electronic structure regarding the camera function is substantially the same as that of FIG. 6.

A portable telephone terminal 5 illustrated in FIG. 20 and FIG. 21 is, for instance, a portable telephone terminal incorporating the electronic camera function. The portable telephone terminal 5 is provided with an image photographing section 51, a gripping section 52, and a flexion/transformation mechanism 53.

The image photographing section 51 is mainly a part carrying out the camera function directly relating to photographing of a subject image. The photographing section 51 includes a lens system 51a, a strobe light emitting section 51b, an optical finder 51c, a release button 51d, a mode button section 51e; and a display section 11g. Furthermore, a receiving speaker 51k serving as the portable telephone terminal and an antenna 51m are provided in the image photographing section 51. Furthermore, the main part of an electronic circuit for realizing the image photographing function of the portable telephone terminal 5 is accommodated in the image photographing section 51. The lens system 51a captures an optical image of a subject. The strobe light emitting section 51b radiates an illumination light onto the subject. The optical finder 51c is used for confirming the visual field to be photographed by the lens system 51a with the optical image. The release button 51d instructs the timing of image photographing by being operated, and performs the release operation at that time. The mode/operation button section 51e includes one or more buttons such as push buttons. These buttons are used for performing selection and setting operations of a photographing mode and various sorts of operation modes, etc.

The mode/operation button section 51f is used for setting the mode for the portable telephone function and for various sorts of operations. The display section 51g includes an LCD (Liquid Crystal Display), and the display section 51g displays the operation states by the mode/operation button section 51f, the number of photographed subjects, the residual quantity of electricity in a battery, and the other operation states of the portable telephone terminal 5.

The gripping section 52 is the part used as the grip for gripping the portable telephone terminal 5 as in the camera at the time of photographing. The griping section 52 accommodates, for instance, a battery as the power source and a recording medium for recording an image of a subject.

For this reason, the gripping section 52 is provided with a battery cover 52b capable of being opened and closed at the time of setting and removing the recording medium or the battery. In the state where the battery cover 52b has been removed, the recording medium can be set or removed. Furthermore, the gripping section 52 is provided with a telephone operating section 52c such as a dial button, etc. and a transmitting microphone 52d for the portable telephone function.

When the portable telephone terminal 5 is carried, the image photographing section 51 and the gripping section 52 are linearly connected with each other and arranged in a straight line so as to be formed in a shape of a flat stick as illustrated in FIGS. 20 and 21. The combining parts of the image photographing section 51 and the gripping section 52 are closely connected with each other at an inclined surface intersecting an axis line along the elongated direction, for instance, at a plane inclined by almost 45 degrees relative to the upper and lower surfaces of the portable telephone terminal 5. A flexion/transformation mechanism 53 is provided at the place where the combining parts of the image photographing section 51 and the gripping sections 52 are closely connected with each other.

The flexion/transformation mechanism 53 is constructed in substantially the same manner as that of FIG. 3. The flexion/transformation mechanism 53 is constructed so as to relatively rotate on the above-described inclined surface and to be prevented from slipping therefrom. The combining parts of the image photographing section 51 and the gripping section 52 are constructed so as to have suitable resistances against the rotational movement with a frictional or viscous damping, etc., and to be stopped at a predetermined rotational position as described later by use of a click stop mechanism, etc. The image photographing section 51 and the gripping section 52 are connected with each other by the flexion/transformation mechanism 53. By relatively rotating the image photographing section 51 and the gripping section 52, the portable telephone terminal 5 can be flexed so as to be transformed from a carrying state illustrated in FIGS. 20 and 21, in which the photographing section 51 and the gripping sections 52 are arranged on the same straight line so that the portable telephone terminal 5 is formed in an elongated flat stick shape, to a photographing state illustrated in FIG. 23, in which the image photographing section 51 and the gripping section 52 become perpendicular to each other such that the portable telephone terminal 5 is in a shape of a reverse "L".

Namely, in the carrying state illustrated in FIGS. 20 and 21, the portable telephone terminal 5 is in a form of a stick as in the case of ordinary telephone terminals, so as to be suitable for being carried in a bag, etc. or for attaching a strap thereto for hanging it on the neck or the wrist. When photographing with the portable telephone terminal 5, because it is difficult to photograph in the carrying state, the photographing section 51 and the gripping section 52 are rotated relatively by use of the flexion/transformation mechanism 53 that is substantially the same as that illustrated in FIG. 3. The rotation shaft of the flexion/transformation mechanism 53 is the axis line C illustrated in FIG. 21. When the gripping section 52 is relatively rotated in the clockwise direction relative to the combining surface of the image photographing section 51, the gripping section 52 is gradually angled relative to the image photographing section 51 as illustrated in FIG. 22. Finally, at the time of rotating by almost 180 degrees, the gripping section 52 becomes perpendicular to the image photographing section 51 as illustrated in FIG. 23.

In this state, as the case illustrated in FIG. 7, for instance, by gripping the gripping section 52 with the right hand, the photographer can easily operate the release button 51d with the gripping right hand while viewing the window of the optical finder 51C. For maintaining the above-described configurations of the carrying state and the photographing state even when an external force is applied to the portable telephone terminal 5, it is preferable to provide a stopping mechanism such as a click stop mechanism, etc. to the flexion/transformation mechanism 53, so as to stop the the flexion/transformation mechanism 53 at the position corresponding to the carrying state illustrated in FIGS. 20 and 21 and at the position corresponding to the photographing state illustrated in FIG. 23.

The electronic circuit system for operating the camera function of the portable telephone terminal 5 as illustrated in FIGS. 20 through 23 is substantially the same as that illustrated in FIG. 6.

The aforementioned gripping section 52 accommodates a battery as the power source and a recording medium installing section, and the gripping section 52 is required to supply electricity to the image photographing section 51 and to exchange electric signals therebetween. The power-supply/signal lines between the photographing section 51 and the gripping section 52 can be inserted into a hollow portion, etc. of the flexion/transformation mechanism 53, although not illustrated in the figure. Needless to mention, it may be allowable to use a sliding conductive mechanism such as a well-known slip ring or brush in the flexion/transformation mechanism 53.

The display section 51g may be configured so as to display an image, so as to display a subject image before photographing or being photographed, and to reproduce and displays a photographed subject image stored in a recording medium, etc. In addition, the display section 51g may perform the essential operation of the portable telephone function, such as displaying of the time, the telephone number, etc. The subject image before photographing or being photographed obtained by an image photographing element is displayed on an image surface of the display section 51g, such that the display section 51 is used as the electronic view finder.

By thus structuring the portable telephone terminal 5, in its carrying state, the portable telephone terminal 5 can be put in the shape of a stick suitable for being used as a portable telephone, superior in portability, and moreover suitable for being used as an accessory. Further, at the time of photographing, the portable telephone terminal 5 can be flexed and transformed by the flexion/transformation mechanism 53 such that the image photographing section 51 is almost horizontal while the gripping section 52 is almost vertical, thus forming a reverse L-shape. Thereby, the portable telephone terminal 5 can be securely held, and in addition, there is almost no danger of instability caused by a shaky hand because of the adoption of the reverse L-shape.

Furthermore, the flexion angle of the flexion/transformation mechanism 53 can be optionally set easily. For example, the angle can be set to a required angle besides the right angle by configuring the flexion/transformation mechanism 53 such that the flexion is regulated at the required angle, or such that one or more required angles can be set by use of a click stop mechanism, etc. Furthermore, by configuring the gripping section 52 to be stepped at plural flexion angles, the flexion angle can be selectively set.

Furthermore, although the flexion/transformation mechanism 53 employs substantially the same structure as that of the flexion/transformation mechanism 13, the structure of the flexion/transformation mechanism 23 or that of the flexion/transformation mechanism 43 may be also employed.

Furthermore, in the immediately above-described embodiment, although the description has been made with respect to the case of applying the present invention to a portable telephone terminal, the above-described structure may be applied to other terminal apparatuses, for instance, portable information terminals having information processing functions such as schedule control, memo recording, and electronic mail transmission/receipt, etc.

Furthermore, in the above-described embodiments, the description has been made for the cases where stick-state cameras, image inputting apparatuses, or portable terminals, are flexed at one position so as to be gripped. However, they may be configured so as to be flexed at two or more positions, so as to be divided into plural portions. In this case, one of the plural portions divided by the flexion can be used as the image photographing section, and another one of the plural portions can be used as the gripping section.

Figure 24:
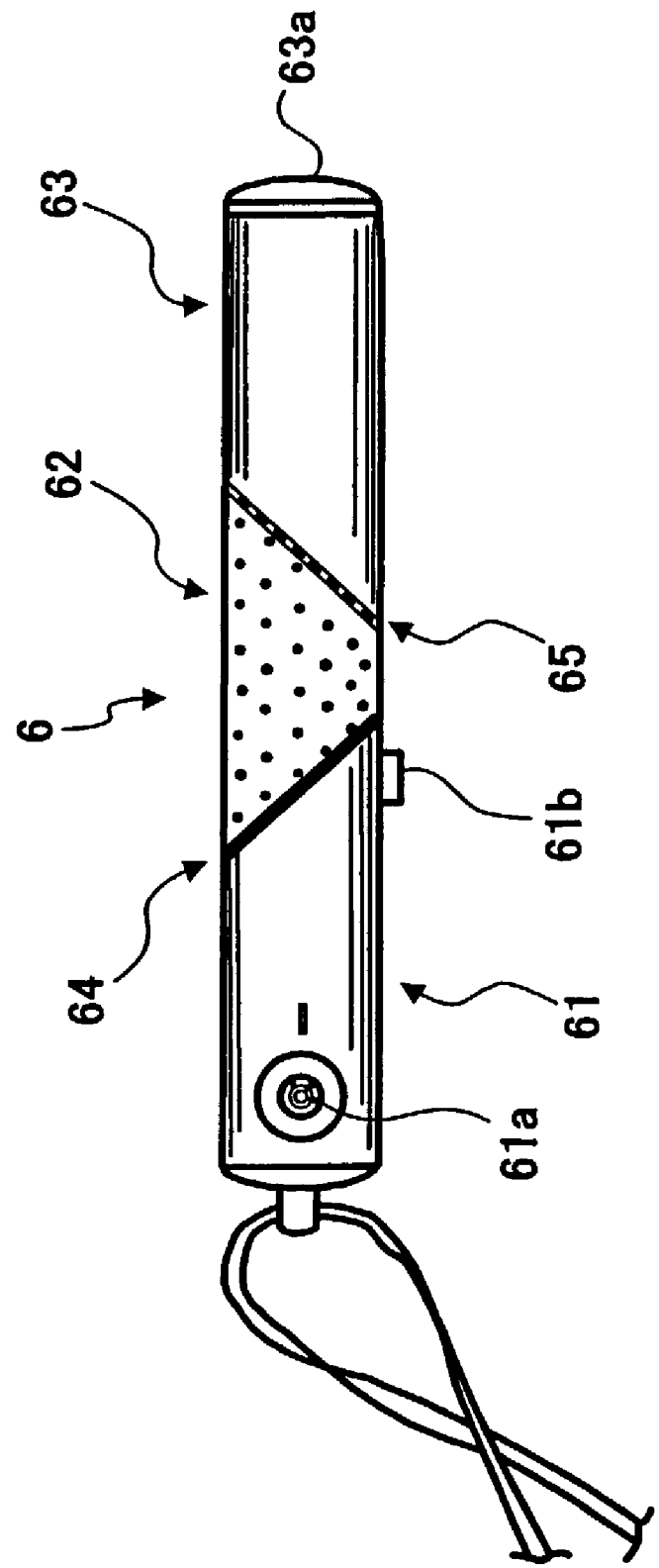
FIG. 24 is a front view of the camera as viewed at the subject side of the camera, schematically illustrating the structure of the camera in the state of being carried, according to another preferred embodiment of the present invention.
Figure 25:
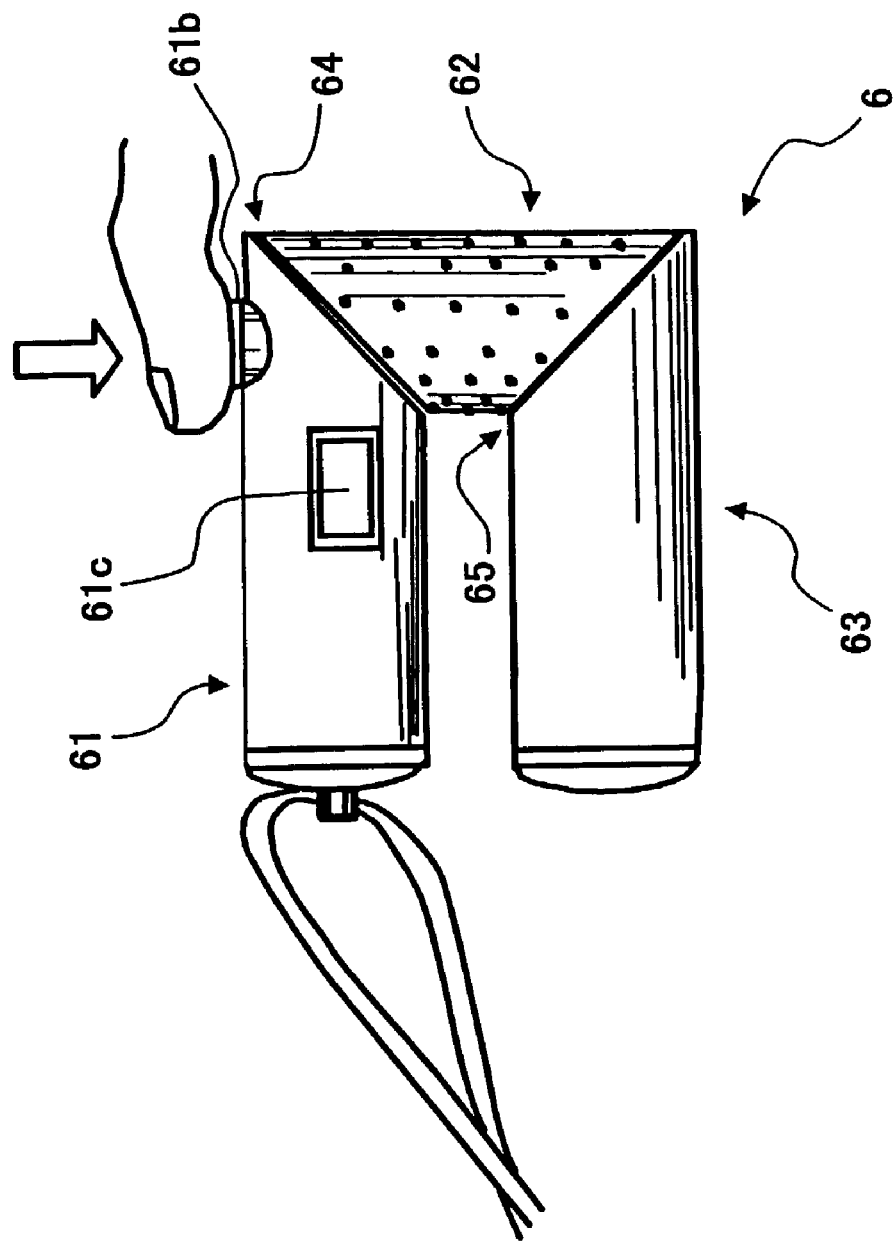
FIG. 25 is a back-surface view of the camera of FIG. 24 as viewed at the photographer side of the camera, illustrating the photographing state of the camera after having been flexed.
Figure 26:
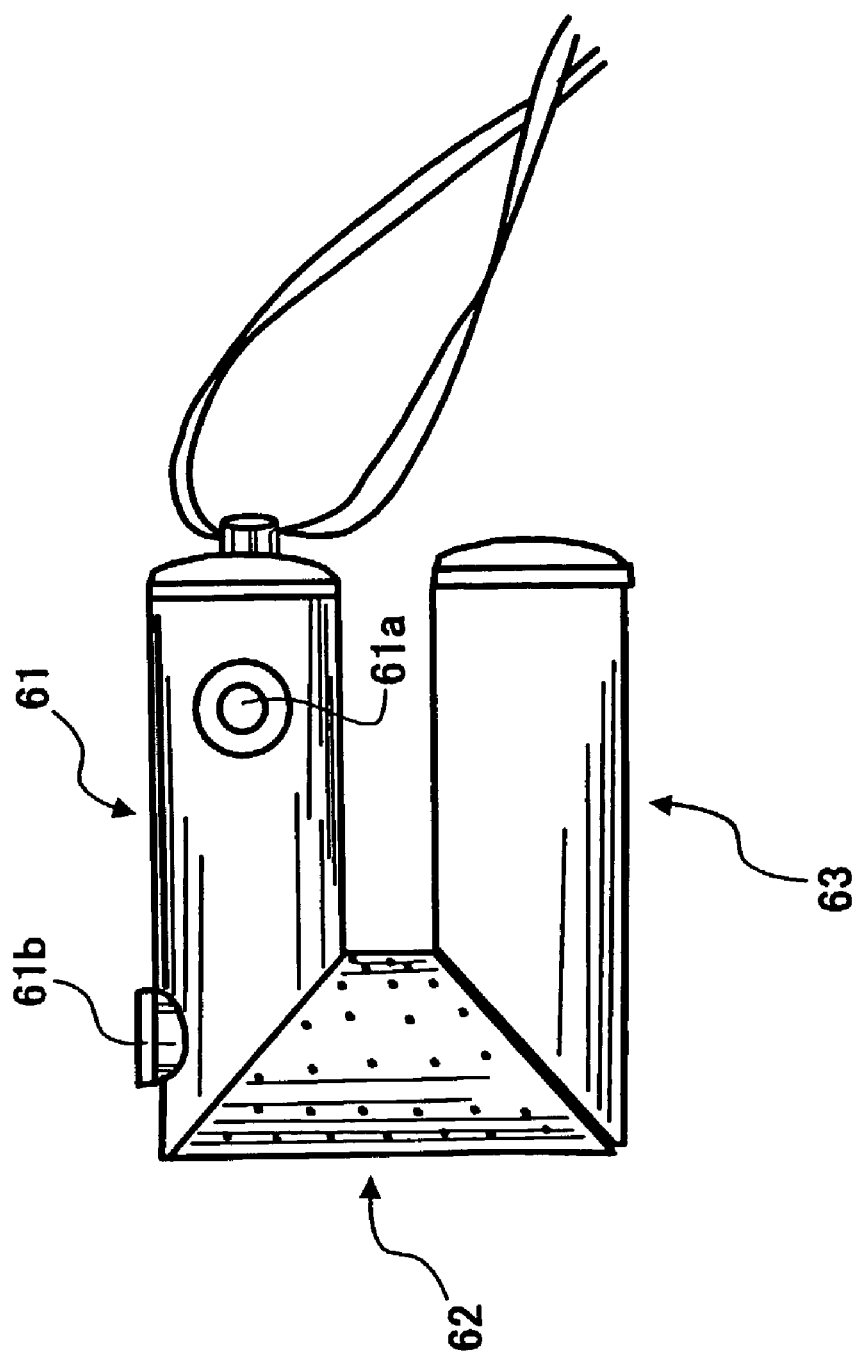
FIG. 26 is a front view of the camera as viewed at the subject side of the camera, illustrating the photographing state of the camera after having been flexed.

FIGS. 24 through 26 illustrate a structure of a camera according to another preferred embodiment of the present invention. FIG. 24 is a front view of the camera as viewed at the subject side, schematically illustrating the structure of the camera in a state of being carried. FIG. 25 is a back-surface view of the camera viewed from the photographer side, illustrating the structure of the camera in a photographing state after having been flexed. FIG. 26 is a front view of the camera as viewed at the subject side, illustrating the structure of the camera in the photographing state after having been flexed. The electronic part of the camera is substantially the same as that of FIG. 6.

A camera 6 illustrated in FIGS. 24 through 25 is for example an electronic camera. The camera 6 includes an image photographing section 61, a gripping section 62, a battery accommodation section 63, a first flexion/transformation mechanism 64 and a second flexion/transformation mechanism 65.

The image photographing section 61 is the part directly relating, mainly, to image photographing of a subject image. The photographing section 61 includes a lens system 61a, a release button 61b, and a finder eye-contact part 61c, etc. The lens system 61a captures an optical image of a subject. The release button 61b instructs a timing of photographing by being operated, and performs the release operation. The finder eye-contact part 61c is the eyepiece of an optical finder or an electronic finder. When the finder system is the optical finder, the optical image in a photographing visual field is formed, utilizing a part of the light flux of the lens system 61a for use in the photographing, and the optical image thus formed can be observed by the finder eyepiece 61c.

When the finder system is the electronic finder, the image information photographed by an image photographing element is displayed on an interior display thereof, and the image information thus displayed can be observed by use of the finder eyepiece 61c. The gripping section 62 is the part used as the grip for gripping the camera 6 at the time of photographing. For instance, the outer circumferential surface of the camera 6 is covered with, for instance, rubber, in order to prevent slipping or sliding thereon. The battery accommodating section 63 accommodates, for instance, a battery as the power source. For this reason, the battery accommodating section 63 is provided with a battery cover 63a which is opened and closed at the time of setting and removing the battery. Moreover, various sorts of operating sections and a recording medium, etc. may be covered at suitable positions with covers capable of being opened and closed, although they are not illustrated in the figures. As a matter of course, the camera 6 may be configured to perform wireless transmission of photographed image data to a PC or a portable information terminal, etc. in the vicinity. On this occasion, the recording medium, etc. is not needed. Furthermore, the electronic circuit for realizing the photographing function of the camera 6 is suitably divided and contained in the image photographing section 61, and the gripping section 62 and the battery accommodating section 63.

At the time of carrying the camera 6, the image photographing section 61, the gripping section 62, and the battery accommodating section 63 are linearly connected with each other and arranged in the state of a circular cylinder as illustrated in FIG. 24. The combining parts of the image photographing section 61 and the gripping section 62 are closely connected with each other at an inclined plane intersecting with the axis line along the longitudinal direction, for instance, the plane inclined by almost 45 degrees from the axis line, and the first flexion/transformation mechanism 64 is provided at the place where the image photographing section 61 and the gripping section 62 are connected with each other. The combining parts of the gripping section 62 and the battery accommodating section 63 are also closely connected with each other at an inclined plane intersecting with the axis line along the longitudinal direction, for instance, the plane inclined by almost 45 degrees from the axis line, and the second flexion/transformation mechanism 65 is provided at the place where the gripping section 62 and the battery accommodation section 63 are connected with each other.

Both of the first and second flexion/transformation mechanisms 64 and 65 are constructed in substantially the same manner as that of the flexion/transformation mechanism 13 as illustrated in FIG. 3, so as to be relatively rotated on the above-described inclined surfaces and prevented from slipping down.

Furthermore, the above-described combining parts are constructed so as to have a suitable resistance against rotational movement with frictional or viscous damping, etc. and so as to stop at a predetermined rotational position as described later by use of a click stop mechanism, etc. The first and second flexion/transformation mechanisms 64 and 65 respectively connect the image photographing section 61 with the gripping section 62 and the gripping section 62 with the battery accommodating section 63. In this structure, the first and second flexion/transformation mechanisms 64 and 65 are respectively rotated relatively, and thereby the camera 6 can be flexed and transformed from the carrying state as illustrated in FIG. 24, in which the image photographing section 61, the gripping section 62, and the battery accommodating section 63 are positioned on a same straight line such that the camera 6 is formed in the shape of an elongated cylindrical stick, to the photographing state as illustrated in FIGS. 25 and 26, in which the photographing section 61 and the gripping section 62 and the gripping sections 62 and the battery accommodating section 63 are respectively perpendicular to each other.

Namely, in the carrying state illustrated in FIG. 24, the camera 6 is in the stick state, and thereby is suitable for being carried in a bag, etc. or also suitable for attaching a strap thereto so as to be hung around the neck or the wrist. When photographing with the camera 6, because it is difficult to photograph with the camera 6 in the carrying state, the photographing section 61 and the batter accommodating section 63 are rotated relatively by use of the first and second flexion/transformation mechanisms 64 and 65.

When the first flexion/transformation mechanisms 64 and 65 are both rotated by 180 degrees, the gripping portion 62 becomes almost perpendicular to the image photographing section 61 as illustrated in FIGS. 25 and 26, and further, the battery accommodating section 63 becomes almost perpendicular to the gripping section. As the result, the entire shape of the camera 6 becomes in the shape of an one-side-opened rectangle. In this state, by gripping the gripping section 62 with the right hand, the released button 61b can be easily handled with the gripping right hand.

For maintaining the aforementioned carrying state and the photographing state even when an external force is applied to the camera 6, it may be preferable to provide a stopping mechanism such as a click stop mechanism, etc. in the flexion/transformation mechanisms 64 and 65 at the position corresponding to the carrying state illustrated in FIG. 24 and at the position corresponding to the photographing state illustrated in FIGS. 25 and 26. The electronic circuit system for operating the camera 6 illustrated in FIGS. 24 through 26 uses the structure substantially the same as that in FIG. 6.

Because the electronic circuit system of FIG. 6 is dividedly accommodated in the image photographing section 61, the gripping section 62, and the battery accommodating section 63, it is necessary to supply electricity between the respective sections 61, 62, and 63 and exchange electric signal therebetween. The electricity-supply/signal lines between the respective sections can be inserted through a hollow portion of the first and second flexion/transformation mechanisms 64 and 65. As a matter of course, it may be allowable to use a sliding conductive mechanism such as a well-known slip ring and brush, etc. By thus structuring the camera 6, the camera 6 can be made in the shape of a stick superior in portability and having a preferable outer appearance suitable for being used as an accessory at the time of being carried. At the time of photographing, the camera 6 can be flexed and transformed by the flexion/transformation mechanisms 64 and 65, such that the image photographing section 61 is almost horizontal and the gripping section 62 is almost vertical. Therefore, the camera 6 has a configuration of an inverse "L", suitable for being surely held by the photographer and having a very low probability of being shaken by the hand.

Furthermore, the flexion angle formed by the flexion/transformation mechanisms 64 and 65 can be optionally set easily. The flexion angle can be set to a desired angle besides the right angle by regulating the flexion at the desired angle or by setting one or more desired angles by use of a click step mechanism, etc. Furthermore, by configuring the gripping section 62 so as to be stopped at plural flexion angles, the flexion angle can be selectively set in accordance with the desired angle.

Furthermore, the camera 6 may be configured such that the power source switch is caused to co-operate with at least the first flexion/transformation mechanism 64, and when the gripping section 62 is angled relative to the image photographing section 61 the power source is switched on. Furthermore, even on this occasion, the present invention is not always limited to cameras, and the present invention can be applied to other image inputting apparatuses.

The present invention is not limited to the embodiments described heretofore and illustrated in the drawings. It is possible to realize various modifications or variations within the scope not departing from the scope of the present invention.

For instance, in the above-described embodiments, although each of the grip stop mechanisms has a position determining function for determining the position of a flexion/transformation angle between an image photographing section and a gripping section, it may be possible to construct a camera such that a stopping mechanism for surely stopping the image photographing section and the gripping section at the carrying position and on the photographing position is provided and such that if the stopping mechanism is not released the both sections cannot be relatively rotated from each other.

Furthermore, regarding the length ratio between an image photographing section and a gripping section, it is desirable that the image photographing section be longer than the gripping section in the case of a camera having a large number of functions, while it is desirable that the gripping section be longer than the image photographing section in the case of a camera having only a simple function (for instance, the camera not having a strobe), so as to be further improved in operability.

Furthermore, in the above-described embodiments, with respect to cameras, an electronic camera has been exemplarily described. However, the present invention can be applied to cameras employing a silver salt film.

Heretofore, the preferred embodiments of the present invention have been described with respect to cameras, image inputting apparatuses, portable terminal devices, and a method of changing a camera configuration. The advantageous functional effects of the present invention are described hereinafter for respective aspects of the invention.

As is apparent from the foregoing description, according to the present invention, a camera, an image inputting apparatus, and a portable terminal device that are superior in the portability and the outer appearance when being carried and at the same time, are superior in the holding performance and the operability when photographing are realized with a simple structure to form a body in a longitudinal rectangular shape so as to be suitable for being carried and by providing a flexion/transformation mechanism to angle a gripping portion relative to a photographing portion of the body for photographing.

In particular, the appearance of the flexion/transformation mechanism can have a good outer appearance by configuring the flexion/transformation mechanism to include a mechanism to connect an image forming portion and a gripping section with each other on an inclined surface obliquely intersecting with a straight line on which the image photographing section and the gripping sections are disposed when the body is formed in the longitudinal rectangular shape, and to be relatively rotated around the axis line almost perpendicular to the inclined surface.

Further, with a provision of a flexible member that cannot be easily bent in the flexion/transformation mechanism, stable holding of the gripping portion in photographing can be realized.

Also, by providing a cover configured to cover the flexion/transformation mechanism and the photographing section in the carrying state, for example, a lens system for photographing can be protected.

Further, by providing the operation part, such as the release button and the strobe light emitting portion, etc. in the photographing section, not in the gripping section, there is no danger of erroneously operating the operation part by gripping of the gripping section. Furthermore, with a provision of a power on/off device configured to turn on the power source when the gripping portion is angled relative to the mage photographing section, secure and speedy operation is realized.

Further, according to the present invention, the configuration of a body of a camera can be easily changed from a carrying configuration for obtaining a preferable portability and a good-looking outer appearance suitable for being carried in a photographing configuration for obtaining preferable holding performance and operability at the time of photographing, and vice versa.

The preferred embodiments of the present invention have been described heretofore. However, numerous additional modifications and variations of the present invention are possible in light of the above teachings. It is therefore to be understood that, within the scope of the appended claims, the present invention may be practiced other wise than as specifically described herein.

What is claimed is:

1. A communication device comprising:
a first body section including,
a lens system configured to capture an image of a subject,
a display configured to display said image, and
a light emitting section configured to radiate an illumination light onto said subject; and
a second body section rotatably connected to said first body section, including,
a telephone keypad, and
a space configured to accommodate a battery as a power source.

2. The communication device of claim 1, wherein said light emitting section and said lens system are positioned on a same side of said first body section.

3. The communication device of claim 1, wherein said second body section is configured to accommodate a removable recording medium.

4. The communication device of claim 1, wherein said display is configured to display said image at least one of before and while said image is captured.

5. The communication device of claim 1, wherein said display is configured to display operation states of said communication device.

6. A communication device comprising:
a first body section including,
a lens system configured to capture an image of a subject, and
a display configured to display said image, said lens system and said display being positioned on different sides of said first body section; and
a second body section rotatably connected to said first body section, including,
a telephone keypad, and
a space configured to accommodate a battery as a power source, wherein said lens system and said display are positioned on adjacent sides of said first body section.

7. A communication device comprising:
a first body section including,
a lens system configured to capture an image of a subject,
a display configured to display said image, and
a release button configured to perform a shutter release operation; and
a second body section rotatably connected to said first body section, including,
a telephone keypad, and
a space configured to accommodate a battery as a power source, wherein said release button and said lens system are positioned on adjacent sides of said first body section.

8. A communication device comprising:
a first body section including,
a lens system configured to capture an image of a subject,
a display configured to display said image, and
a speaker, said speaker and said lens system being positioned on different sides of said first body section; and
a second body section rotatably connected to said first body section, including,
a telephone keypad, and
a space configured to accommodate a battery as a power source, wherein said speaker and said lens system are positioned on adjacent sides of said first body section.

9. A portable terminal device comprising:
a body including,
a release button configured to perform a shutter release operation,
an image photographing section including a display and a lens system, said lens system being integrally formed with the body and being configured to photograph a subject,
a hand-held gripping section configured to allow a user to grip said body, and
a connecting mechanism configured to connect said image photographing section and said gripping section in a rotatable manner such that an angle between a longitudinal axis of said image photographing section and a longitudinal axis of said gripping section can be varied, wherein said gripping section is configured to accommodate a removable recording medium.

10. The portable terminal device of claim 9, wherein said image photographing section and said gripping section are each arranged in a substantially rectangular shape.

11. The portable terminal device of claim 9, wherein said gripping section is configured to accommodate a battery as a power source.

12. The portable terminal device of claim 9, wherein said gripping section includes a telephone operating section.

13. The portable terminal device of claim 9, wherein said longitudinal axis of said image photographing section and said longitudinal axis of said gripping section are rotatable about an axis perpendicular to said longitudinal axes.

14. The portable terminal device of claim 9, wherein said connecting mechanism includes a stopping mechanism configured to limit rotation of at least one of said image photographing section and said gripping section.

15. The portable terminal device of claim 9, wherein said display is configured as a liquid crystal display.

16. The portable terminal device of claim 9, wherein said display is configured to be used as an electronic view finder.

17. The portable terminal device of claim 16, wherein said display is configured to display said image at least one of before and while said image is captured.

18. The portable terminal device of claim 9, wherein said display is configured to display operation states of said portable terminal device.

19. The portable terminal device of claim 9, wherein said lens system is fixedly attached to said image photographing section.

20. The portable terminal device of claim 9, wherein said portable terminal device is a portable telephone.

21. A portable terminal device comprising:
a body including,
an image photographing section including a display, a light emitting section configured to radiate an illumination light onto a subject, and a lens system, said lens system being configured to capture an image of a subject,
a gripping section for a user to grip said body, and
a connecting mechanism configured to connect said image photographing section and said gripping section in a rotatable manner such that an angle between a longitudinal axis of said image photographing section and a longitudinal axis of said gripping section can be varied.

22. The portable terminal device of claim 21, wherein said light emitting section and said lens system are positioned on a same side of said image photographing section.

23. A portable terminal device comprising:
a body including,
a release button configured to perform a shutter release operation,
an image photographing section including a display and a lens system, said lens system being configured to capture an image of a subject and being integrally formed with the body, and said lens system and said display being positioned on different sides of said image photographing section,
a gripping section configured to allow a user to grip said body, and
a connecting mechanism configured to connect said image photographing section and said gripping section in a rotatable manner such that an angle between a longitudinal axis of said image photographing section and a longitudinal axis of said gripping section can be varied, wherein said lens system and said display are positioned on adjacent sides of said image photographing section.

24. A portable terminal device comprising:
a body including,
an image photographing section including a display, a release button configured to perform a shutter release operation, and a lens system, said lens system being configured to capture an image of a subject,
a gripping section for a user to grip said body, and
a connecting mechanism configured to connect said image photographing section and said gripping section in a rotatable manner such that an angle between a longitudinal axis of said image photographing section and a longitudinal axis of said gripping section can be varied, wherein said release button and said lens system are positioned on adjacent sides of said image photographing section.

25. A portable terminal device comprising:
a body including,
an image photographing section including a display, a lens system, said lens system being configured to capture an image of a subject, and a speaker, said speaker and said lens system being positioned on different sides of said image photographing section,
a gripping section for a user to grip said body, and
a connecting mechanism configured to connect said image photographing section and said gripping section in a rotatable manner such that an angle between a longitudinal axis of said image photographing section and a longitudinal axis of said gripping section can be varied, wherein said speaker and said lens system are positioned on adjacent sides of said image photographing section.

26. A camera comprising:
a camera body having a longitudinal rectangular shape, said camera body comprising,
a release button configured to perform a shutter release function,
an image photographing section including a lens system for capturing an optical image of a subject and including a display configured to display said optical image, and
a gripping section for a user to grip said camera body at a time of photographing, wherein,
said image photographing section and said gripping section are rotatably connected,
in a first state, both a longitudinal axis of said image photographing section and a longitudinal axis of said gripping section are parallel to a first axis such that the camera body is formed in said longitudinal rectangular shape,
in a second state, said longitudinal axis of said gripping section is angled relative to said longitudinal axis of said image photographing section such that at least one of said longitudinal axes of said gripping section and said image photographing section is arranged along an axis angled relative to the first axis, and
said gripping section accommodates a battery as a power source, wherein said lens system and said display are positioned on adjacent sides of said image photographing section.

27. The camera of claim 26, wherein said image photographing section and said gripping section are each arranged in a substantially rectangular shape.

28. The camera of claim 26, wherein said image photographing section includes a light emitting section configured to radiate an illumination light onto said subject.

29. The camera of claim 26, wherein said light emitting section and said lens system are positioned on a same side of said image photographing section.

30. The camera of claim 26, wherein said release button is positioned on the image photographing section.

31. The camera of claim 30, wherein said release button and said lens system are positioned on different sides of said image photographing section.

32. The camera of claim 31, wherein said release button and said lens system are positioned on adjacent sides of said image photographing section.

33. The camera of claim 26, wherein said gripping section is configured to accommodate a removable recording medium.

34. The camera of claim 26, wherein said gripping section includes a telephone operating section.

35. The camera of claim 26, wherein said image photographing section includes a speaker, said speaker and said lens system being positioned on different sides of said image photographing section.

36. The camera of claim 35, wherein said speaker and said lens system are positioned on adjacent sides of said image photographing section.

37. The camera of claim 26, wherein said longitudinal axis of said image photographing section and said longitudinal axis of said gripping section are rotatable about an axis perpendicular to said longitudinal axes.

38. The camera of claim 26, comprising a stopping mechanism configured to limit rotation of at least one of said image photographing section and said gripping section.

39. The camera of claim 26, wherein said display is configured as a liquid crystal display.

40. The camera of claim 26, wherein said display is configured to be used as an electronic view finder.

41. The camera of claim 26, wherein said display is configured to display said image at least one of before and, while said image is captured.

42. The camera of claim 26, wherein said display is configured to display operation states of said camera.

43. A camera comprising:
a camera body having a longitudinal rectangular shape, said camera body comprising,
an image photographing section including,
means for capturing an optical image of a subject, and
means for displaying said optical image and operation states of the camera,
a gripping section for a user to grip said camera body at a time of photographing, and
means for rotating said image photographing section and said gripping section relative to one another such that,
in a first state, both a longitudinal axis of said image photographing section and a longitudinal axis of said gripping section are positioned parallel to a first axis such that the camera body is formed in said longitudinal rectangular shape, and
in a second state, said longitudinal axis of said gripping section is positioned angled relative to said longitudinal axis of said image photographing section such that at least one of said longitudinal axes of said gripping section and said image photographing section is arranged along an axis angled relative to the first axis, wherein said gripping section accommodates means for providing power to the camera, wherein said means for capturing and said means for displaying are positioned on adjacent sides of said image photographing section.

44. The camera of claim 43, wherein said image photographing section and said gripping section are each arranged in a substantially rectangular shape.

45. The camera of claim 43, wherein said image photographing section includes a light emitting section configured to radiate an illumination light onto said subject.

46. The camera of claim 45, wherein said light emitting section and said lens system are positioned on a same side of said image photographing section.

47. The camera of claim 43, wherein said image photographing section includes a release button configured to perform a shutter release operation.

48. The camera of claim 47, wherein said release button and said means for capturing are positioned on different sides of said image photographing section.

49. The camera of claim 48, wherein said release button and said means for capturing are positioned on adjacent sides of said image photographing section.

50. The camera of claim 43, wherein said gripping section is configured to accommodate a removable recording medium.

51. The camera of claim 43, wherein said gripping section includes a telephone operating section.

52. The camera of claim 43, wherein said image photographing section includes a speaker, said speaker and said means for capturing being positioned on different sides of said image photographing section.

53. The camera of claim 52, wherein said speaker and said means for capturing are positioned on adjacent sides of said image photographing section.

54. The camera of claim 43, wherein said longitudinal axis of said image photographing section and said longitudinal axis of said gripping section are rotatable about an axis perpendicular to said longitudinal axes.

55. The camera of claim 43, comprising a stopping mechanism configured to limit rotation of at least one of said image photographing section and said gripping section.

56. The camera of claim 43, wherein said means for displaying includes a liquid crystal display.

57. The camera of claim 43, wherein said means for displaying is used as an electronic view finder.

58. The camera of claim 43, wherein said means for displaying displays said image at least one of before and, while said image is captured.

59. A communication device comprising:
means for performing a shutter release operation;
a first body section including:
means for capturing an image of a subject, and
means for displaying said image; and
a second body section rotatably connected to said first body section, including:
means for operating a telephone dial function, and
means for accommodating a power source, wherein said capturing means and said displaying means are positioned on adjacent sides of said first body section.

60. The communication device of claim 59, further comprising:
means for connecting said first body section and said second body section in a rotatable manner.

61. The communication device of claim 60, wherein said connecting means further comprises:
means for limiting rotation of at least one of said first body section and said second body section.

62. The communication device of claim 59, when said connecting means includes a hinge.

63. The communication device of claim 59, wherein said first body section and said second body section are each arranged in a substantially rectangular shape.

64. The communication device of claim 59, wherein said first body section further includes:
means for radiating an illumination light onto said subject.

65. The communication device of claim 64, wherein said radiating means and said capturing means are positioned on a same side of said first body section.

66. The communication device of claim 59, wherein said performing means and said capturing means are positioned on different sides of said first body section.

67. The communication device of claim 66, wherein said performing means and said capturing means are positioned on adjacent sides of said first body section.

68. The communication device of claim 59, wherein said second body section further includes:
means for accommodating a removable recording medium.

69. The communication device of claim 59, wherein said first body section further includes:
means for emitting sound.

70. The communication device of claim 69, wherein said emitting means and said capturing means are positioned on different sides of said first body section.

71. The communication device of claim 70, wherein said emitting means and said capturing means are positioned on adjacent sides of said first body section.

72. The communication device of claim 59, wherein a longitudinal axis of said first body section and a longitudinal axis of said second body section are rotatable about an axis perpendicular to said longitudinal axes.

73. The communication device of claim 59, wherein said displaying means includes a liquid crystal display.

74. The communication device of claim 59, wherein said displaying means includes means for electronic view finding.

75. The communication device of claim 59, wherein said displaying means includes means for displaying operation states of said communication device.

76. A method for operating a communication device including a first body section and a second body section, comprising:
arranging a power source in an interior compartment of said second body section;
providing power from said power source to a display screen of said first body section;
performing a shutter release operation with a release button of the communication device to capture an image of a subject with a lens system arranged at said first body section while gripping a portion of the second body section;
displaying said captured image on said display screen;
operating a telephone keypad of said second body section, said second body section being rotatably connected to said first body section; and
recording a captured image in a removable storage medium accommodated in said second body section.

77. The method of claim 76, further comprising:
confirming a visual field to be captured, said visual field including said subject.

78. The method of claim 77, further comprising:
viewing said display screen to confirm said visual field.

79. The method of claim 76, further comprising:
setting an operation mode of said communication device with mode buttons of said first body section.

80. The method of claim 79, further comprising:
displaying said operation mode on said display screen.

81. The method of claim 76, further comprising:
displaying on said display screen a residual power amount of said power source.

82. The method of claim 76, further comprising:
displaying on said display screen a number indicating a quantity of captured images.

83. The method of claim 76, further comprising:
retrieving and displaying a recorded image from said removable storage medium.

84. The method of claim 76, wherein said lens system is fixedly attached to said first body section.

85. The method of claim 76, wherein said communication device is a portable telephone.

86. A method for operating a communication device including a first body section and a second body section, comprising:
radiating an illumination light onto a subject with a light emitting section of said first body section;
capturing an image of said subject with a lens system disposed on said first body section;
displaying said captured image on a display screen of said first body section;
operating a telephone keypad of said second body section, said second body section being rotatably connected to said first body section; and
recording a captured image in a removable storage medium accommodated in said second body section.

87. A method for operating a communication device including a first body section and a second body section, comprising:
confirming a visual field to be captured, said visual field including a subject, by viewing through an optical finder of said first body section;
capturing an image of said subject with a lens system disposed on said first body section;
displaying said captured image on a display screen of said first body section; and
operating a telephone keypad of said second body section, said second body section being rotatably connected to said first body section.

88. A camera comprising:
a camera body having a longitudinal rectangular shape, said camera body comprising,
a release button configured to perform a shutter release function,
an image photographing section including a lens system for capturing an optical image of a subject and including a display configured to display said optical image, and
a gripping section for a user to grip said camera body at a time of photographing, wherein,
said image photographing section and said gripping section are rotatably connected,
in a first state, both a longitudinal axis of said image photographing section and a longitudinal axis of said gripping section are parallel to a first axis such that the camera body is formed in said longitudinal rectangular shape,
in a second state, said longitudinal axis of said gripping section is angled relative to said longitudinal axis of said image photographing section such that at least one of said longitudinal axes of said gripping section and said image photographing section is arranged along an axis angled relative to the first axis,
said gripping section accommodates a battery as a power source, wherein said lens system and said display are positioned on adjacent sides of said image photographing section, and
said image photographing section includes a light emitting section configured to radiate an illumination light onto said subject.

89. A camera comprising:
a camera body having a longitudinal rectangular shape, said camera body comprising,
  a release button configured to perform a shutter release function,
  an image photographing section including a lens system for capturing an optical image of a subject and including a display configured to display said optical image, and
  a gripping section for a user to grip said camera body at a time of photographing, wherein,
said image photographing section and said gripping section are rotatably connected,
in a first state, both a longitudinal axis of said image photographing section and a longitudinal axis of said gripping section are parallel to a first axis such that the camera body is formed in said longitudinal rectangular shape,
in a second state, said longitudinal axis of said gripping section is angled relative to said longitudinal axis of said image photographing section such that at least one of said longitudinal axes of said gripping section and said image photographing section is arranged along an axis angled relative to the first axis,
said gripping section accommodates a battery as a power source, wherein said lens system and said display are positioned on adjacent sides of said image photographing section, and
said release button and said lens system are positioned on adjacent sides of said image photographing section.

90. A camera comprising:
a camera body having a longitudinal rectangular shape, said camera body comprising,
  a release button configured to perform a shutter release function,
  an image photographing section including a lens system for capturing an optical image of a subject and including a display configured to display said optical image, and
  a gripping section for a user to grip said camera body at a time of photographing, wherein,
said image photographing section and said gripping section are rotatably connected,
in a first state, both a longitudinal axis of said image photographing section and a longitudinal axis of said gripping section are parallel to a first axis such that the camera body is formed in said longitudinal rectangular shape,
in a second state, said longitudinal axis of said gripping section is angled relative to said longitudinal axis of said image photographing section such that at least one of said longitudinal axes of said gripping section and said image photographing section is arranged along an axis angled relative to the first axis,
said gripping section accommodates a battery as a power source, wherein said lens system and said display are positioned on adjacent sides of said image photographing section, and
said gripping section is configured to accommodate a removable recording medium.

91. A camera comprising:
a camera body having a longitudinal rectangular shape, said camera body comprising,
  a release button configured to perform a shutter release function,
  an image photographing section including a lens system for capturing an optical image of a subject and including a display configured to display said optical image, and
  a gripping section for a user to grip said camera body at a time of photographing, wherein,
said image photographing section and said gripping section are rotatably connected,
in a first state, both a longitudinal axis of said image photographing section and a longitudinal axis of said gripping section are parallel to a first axis such that the camera body is formed in said longitudinal rectangular shape,
in a second state, said longitudinal axis of said gripping section is angled relative to said longitudinal axis of said image photographing section such that at least one of said longitudinal axes of said gripping section and said image photographing section is arranged along an axis angled relative to the first axis,
said gripping section accommodates a battery as a power source,
said lens system and said display are positioned on adjacent sides of said image photographing section, and
said image photographing section includes a speaker, said speaker and said lens system being positioned on different sides of said image photographing section, and said speaker and said lens system are positioned on adjacent sides of said image photographing section.

92. A camera comprising:
a camera body having a longitudinal rectangular shape, said camera body comprising,
  an image photographing section including,
    means for capturing an optical image of a subject, and
    means for displaying said optical image and operation states of the camera,
  a gripping section for a user to grip said camera body at a time of photographing, and
  means for rotating said image photographing section and said gripping section relative to one another such that,
    in a first state, both a longitudinal axis of said image photographing section and a longitudinal axis of said gripping section are positioned parallel to a first axis such that the camera body is formed in said longitudinal rectangular shape, and
    in a second state, said longitudinal axis of said gripping section is positioned angled relative to said longitudinal axis of said image photographing section such that at least one of said longitudinal axes of said gripping section and said image photographing section is arranged along an axis angled relative to the first axis,
wherein said gripping section accommodates means for providing power to the camera, wherein
said means for capturing and said means for displaying are positioned on adjacent sides of said image photographing section,
said image photographing section includes a light emitting section configured to radiate an illumination light onto said subject, and
said light emitting section and said lens system are positioned on a same side of said image photographing section.

93. A camera comprising:
a camera body having a longitudinal rectangular shape, said camera body comprising, an image photographing section including,
    means for capturing an optical image of a subject, and
    means for displaying said optical image and operation states of the camera,
a gripping section for a user to grip said camera body at a time of photographing, and
means for rotating said image photographing section and said gripping section relative to one another such that, wherein
in a first state, both a longitudinal axis of said image photographing section and a longitudinal axis of said gripping section are positioned parallel to a first axis such that the camera body is formed in said longitudinal rectangular shape, and
in a second state, said longitudinal axis of said gripping section is positioned angled relative to said longitudinal axis of said image photographing section such that at least one of said longitudinal axes of said gripping section and said image photographing section is arranged along an axis angled relative to the first axis,
wherein said gripping section accommodates means for providing power to the camera, wherein
said means for capturing and said means for displaying are positioned on adjacent sides of said image photographing section,
said image photographing section includes a release button configured to perform a shutter release operation, and
said release button and said means for capturing are positioned on adjacent sides of said image photographing section.

94. A camera comprising:
a camera body having a longitudinal rectangular shape, said camera body comprising,
    an image photographing section including,
        means for capturing an optical image of a subject, and
        means for displaying said optical image and operation states of the camera,
    a gripping section for a user to grip said camera body at a time of photographing, and
    means for rotating said image photographing section and said gripping section relative to one another such that,
    in a first state, both a longitudinal axis of said image photographing section and a longitudinal axis of said gripping section are positioned parallel to a first axis such that the camera body is formed in said longitudinal rectangular shape, and
    in a second state, said longitudinal axis of said gripping section is positioned angled relative to said longitudinal axis of said image photographing section such that at least one of said longitudinal axes of said gripping section and said image photographing section is arranged along an axis angled relative to the first axis,
wherein said gripping section accommodates means for providing power to the camera, wherein
said means for capturing and said means for displaying are positioned on adjacent sides of said image photographing section, and
said gripping section is configured to accommodate a removable recording medium.

95. A camera comprising:
a camera body having a longitudinal rectangular shape, said camera body comprising,
    an image photographing section including,
        means for capturing an optical image of a subject, and
        means for displaying said optical image and operation states of the camera,
    a gripping section for a user to grip said camera body at a time of photographing, and
    means for rotating said image photographing section and said gripping section relative to one another such that,
    in a first state, both a longitudinal axis of said image photographing section and a longitudinal axis of said gripping section are positioned parallel to a first axis such that the camera body is formed in said longitudinal rectangular shape, and
    in a second state, said longitudinal axis of said gripping section is positioned angled relative to said longitudinal axis of said image photographing section such that at least one of said longitudinal axes of said gripping section and said image photographing section is arranged along an axis angled relative to the first axis,
wherein said gripping section accommodates means for providing power to the camera, wherein
said means for capturing and said means for displaying are positioned on adjacent sides of said image photographing section,
said image photographing section includes a speaker, said speaker and said means for capturing being positioned on different sides of said image photographing section, and
said speaker and said means for capturing are positioned on adjacent sides of said image photographing section.

96. A communication device comprising:
means for performing a shutter release operation;
a first body section including:
    means for capturing an image of a subject, and
    means for displaying said image; and
a second body section rotatably connected to said first body section, including:
    means for operating a telephone dial function, and
    means for accommodating a power source, wherein said capturing means and said displaying means are positioned on adjacent sides of said first body section, wherein
said first body section further includes means for radiating an illumination light onto said subject, and
said radiating means and said capturing means are positioned on a same side of said first body section.

97. A communication device comprising:
means for performing a shutter release operation;
a first body section including:
    means for capturing an image of a subject, and
    means for displaying said image; and
a second body section rotatably connected to said first body section, including:
    means for operating a telephone dial function, and
    means for accommodating a power source, wherein said capturing means and said displaying means are positioned on adjacent sides of said first body section, wherein said performing means and said capturing means are positioned on adjacent sides of said first body section.

98. A communication device comprising:
means for performing a shutter release operation;
a first body section including:
 means for capturing an image of a subject, and
 means for displaying said image; and
a second body section rotatably connected to said first body section, including:
 means for operating a telephone dial function, and
 means for accommodating a power source, wherein said capturing means and said displaying means are positioned on adjacent sides of said first body section, wherein
said second body section further includes means for accommodating a removable recording medium.

99. A communication device comprising:
means for performing a shutter release operation;
a first body section including:
 means for capturing an image of a subject, and
 means for displaying said image; and
a second body section rotatably connected to said first body section, including:
 means for operating a telephone dial function, and
 means for accommodating a power source, wherein said capturing means and said displaying means are positioned on adjacent sides of said first body section, wherein
said first body section further includes means for emitting sound, and
said emitting means and said capturing means are positioned on adjacent sides of said first body section.

* * * * *